United States Patent [19]

Black et al.

[11] 4,183,813

[45] Jan. 15, 1980

[54] MIXTURE CONCENTRATOR

[75] Inventors: Donald S. Black; J. Bruce Palmer, both of Edmonton, Canada

[73] Assignee: Palmer Engineering Company Ltd., Alberta, Canada

[21] Appl. No.: 960,840

[22] Filed: Nov. 15, 1978

[51] Int. Cl.$^2$ ............................................. B01D 45/14
[52] U.S. Cl. .................................. 210/512 R; 55/407; 55/409; 233/1 C; 233/3
[58] Field of Search ............. 210/196, 512 R, 512 M; 233/1 C, 3, 46; 55/406-409

[56] References Cited

U.S. PATENT DOCUMENTS

| | | | |
|---|---|---|---|
| 1,917,792 | 7/1933 | Bowen | 233/3 X |
| 2,169,300 | 8/1939 | Svensson | 233/46 |
| 2,718,179 | 9/1955 | Cram | 210/512 M |
| 2,791,158 | 5/1957 | Polleys | 210/512 R X |
| 3,271,929 | 9/1966 | Bowden et al. | 55/52 |
| 4,010,891 | 3/1977 | Kartinen | 233/3 |

Primary Examiner—William A. Cuchlinski, Jr.
Attorney, Agent, or Firm—Larson, Taylor and Hinds

[57] ABSTRACT

An improvement in a mixture concentrator on the one hand, or a fluid medium separator on the other, that is usable, for example, for significantly increasing the amount of proppant in a formation fracturing foam is disclosed. The concentrator is comprised of an elongate vessel, a rotor rotatably mounted inside the vessel on a shaft and a motor for rotating the shaft. The vessel has a mixture intake at a forward end and a concentrated mixture outlet and a fluid medium outlet at the rearward end. Mounted on the shaft near the mixture intake is a cylindrical stabilizer which imparts a spin to the incoming mixture. Also mounted on the shaft, downstream of the stabilizer and of the mixture intake is a intake impeller means for removing substantially only the fluid medium from the mixture which is located in the annular channel between the vessel and the rotor to an internal passageway located inside the rotor. The improvement comprises an annular seal located between the rotor and the vessel separating the concentrated mixture outlet and the fluid medium outlet. A further improvement in a preferred embodiment comprises a cylindrical impeller means having a plurality of axially extending slots angularly cut in the cylinder wall.

21 Claims, 20 Drawing Figures

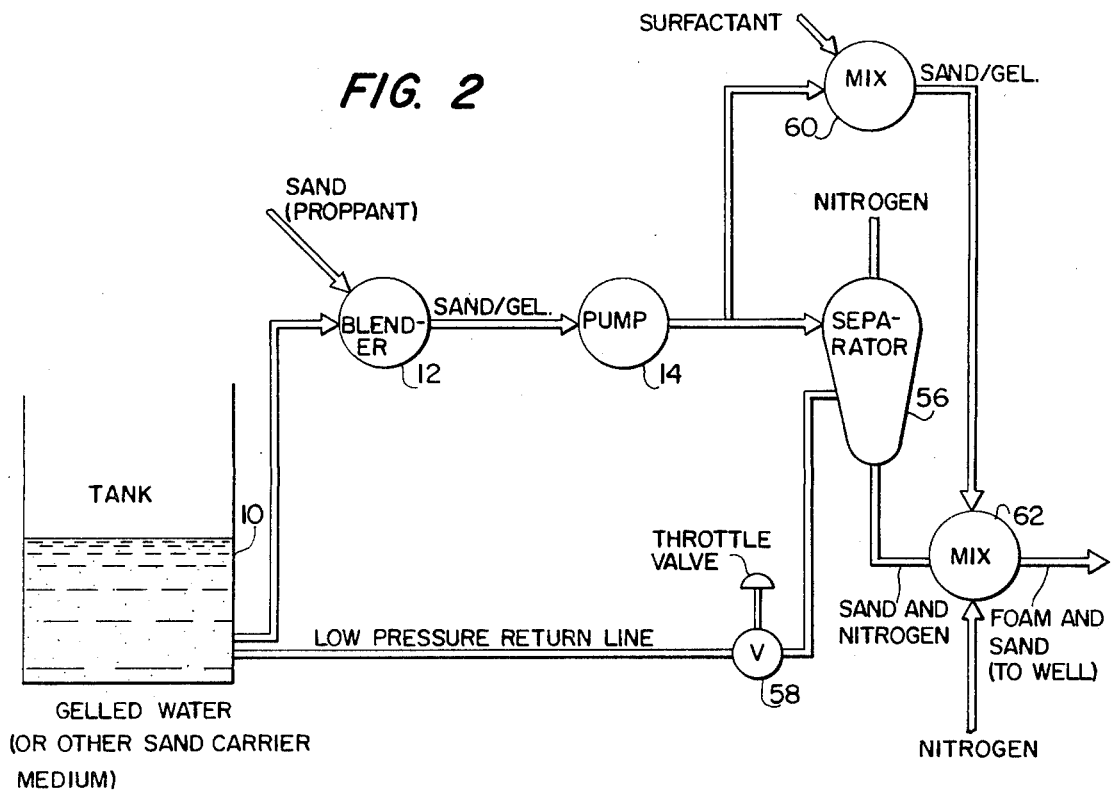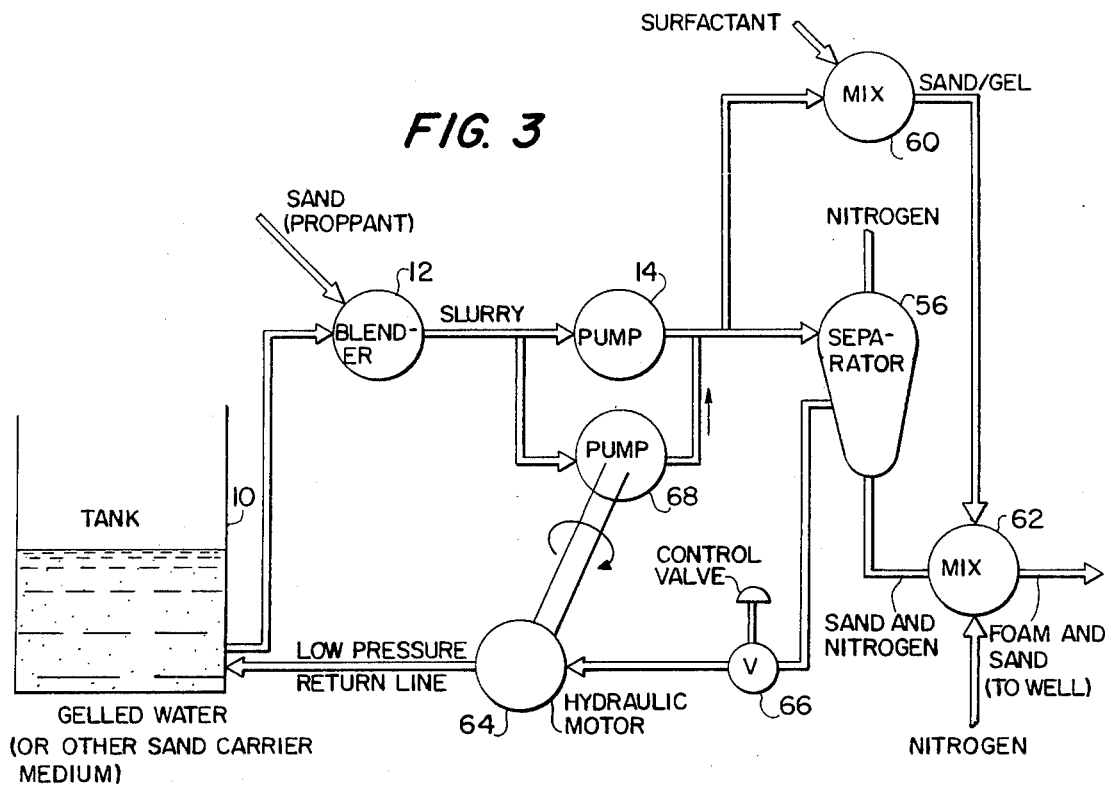

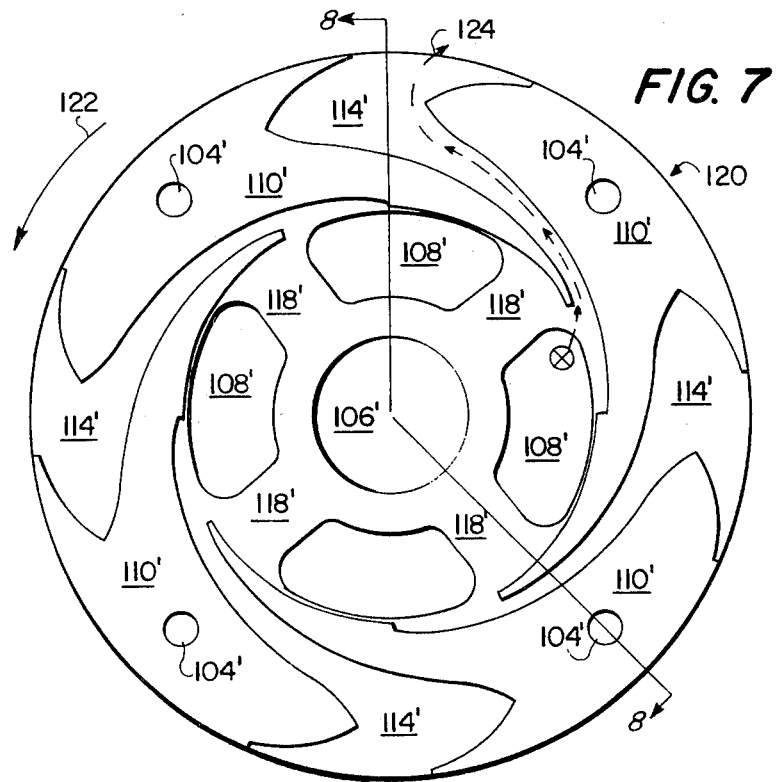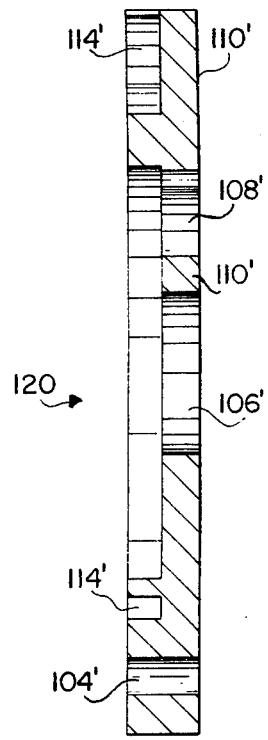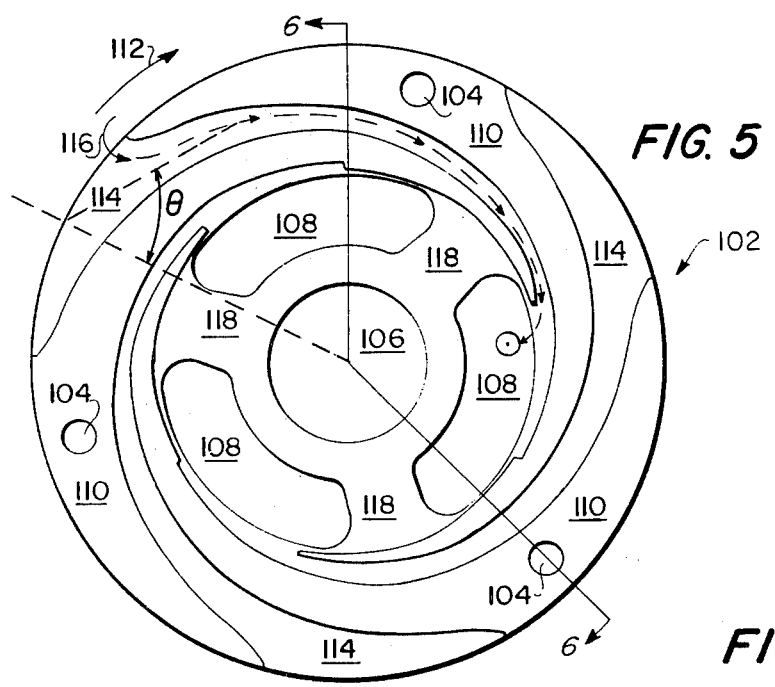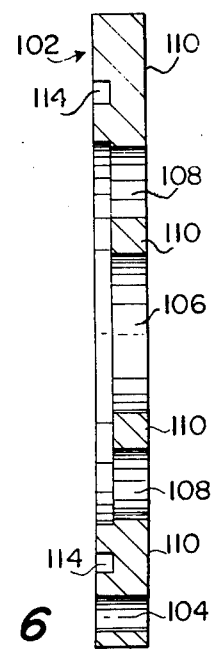
FIG. 7
FIG. 8
FIG. 5
FIG. 6

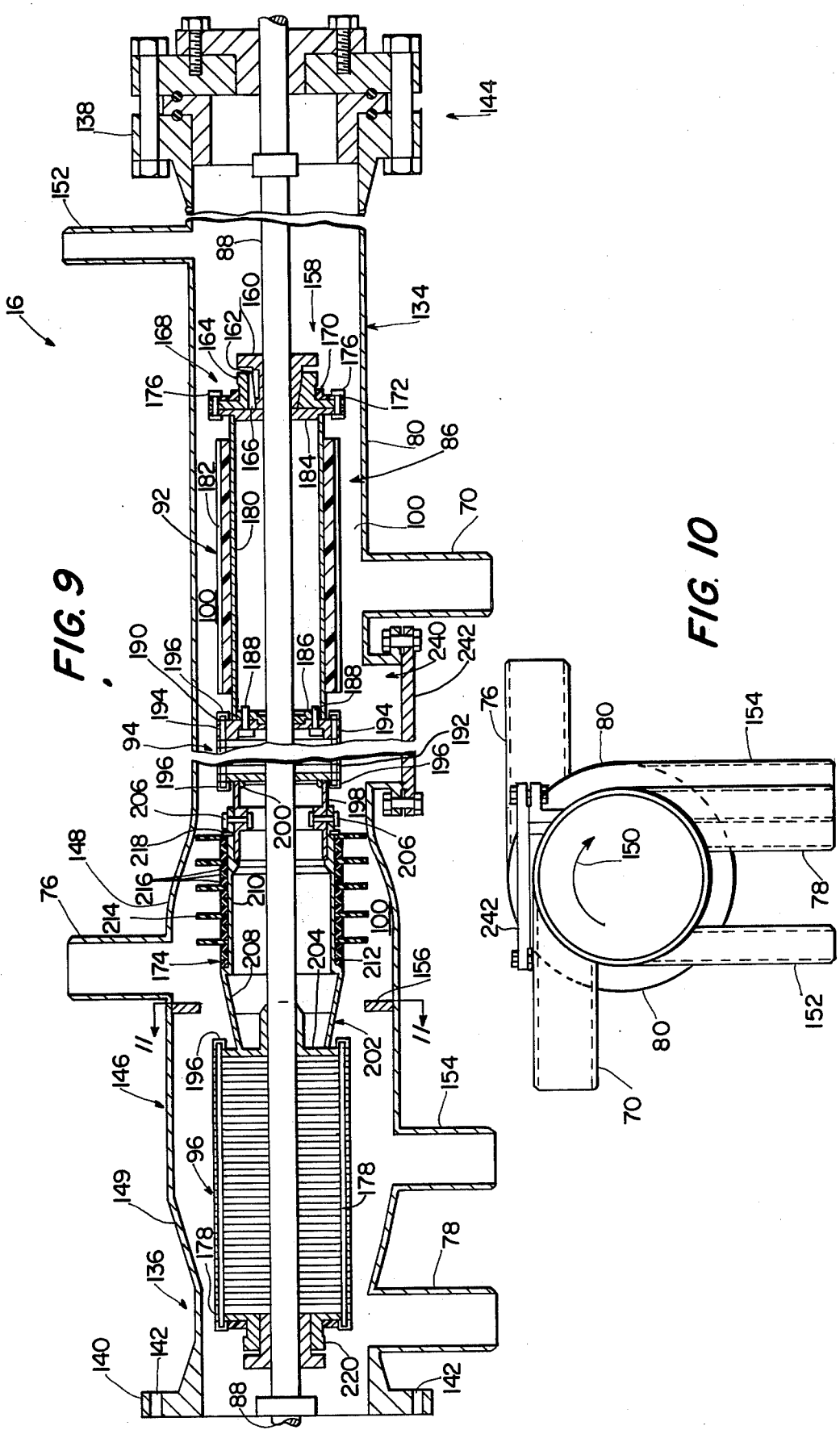

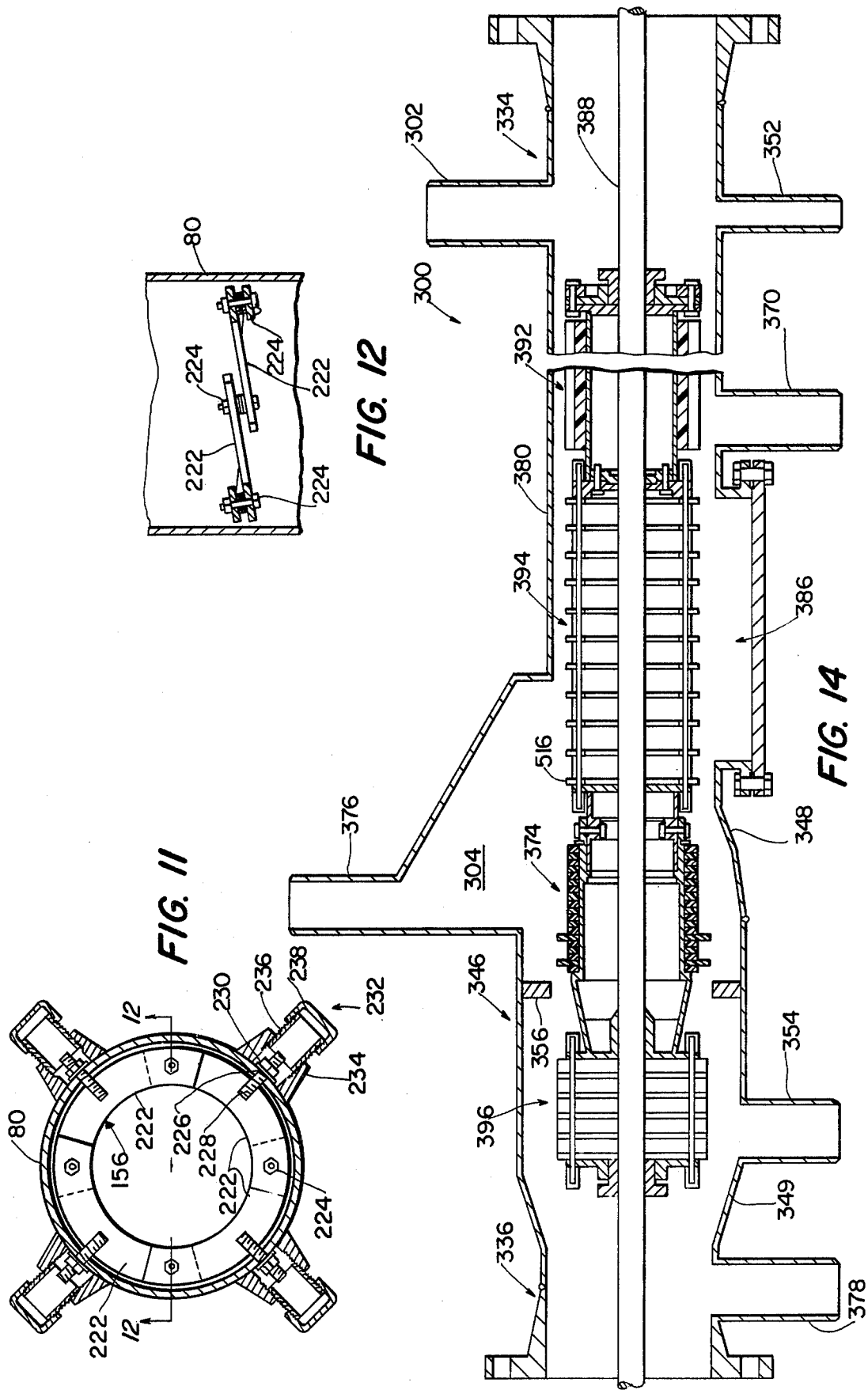

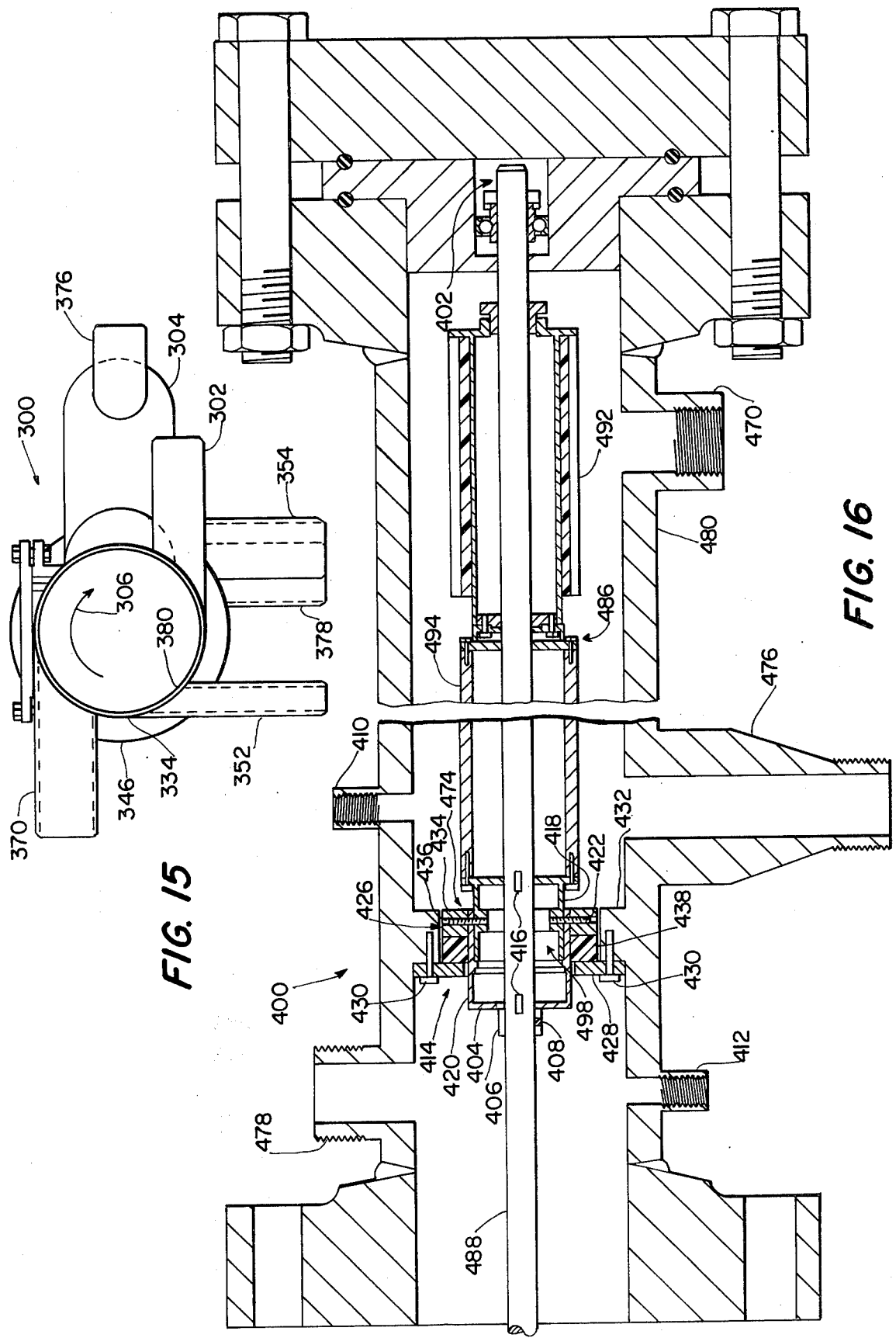

MIXTURE CONCENTRATOR

CROSS-REFERENCE TO RELATED APPLICATIONS

This application is a related application owned by the same assignee of United States patent application Ser. No. 960,841 filed on the same day herewith by only one of the two co-inventors of the present patent application.

FIELD OF THE INVENTION

The present invention relates to improvements to a centrifugal separator and more particularly to a concentrator usable, for example, for removing the carrier of a slurry.

BACKGROUND OF THE INVENTION

Various methods are well known to stimulate production of crude oil and natural gas from wells drilled in reservoirs of low permeability, although emphasis has been placed on hydraulically fracturing such formations with various liquids, such as native crude oil, with or without propping agents, such as sand, suspended therein. The hydraulic pressure applied to such low permeable formations creates tensile stresses in the rock of the formation surrounding the well bore and these stresses causing splitting, parting or fracturing of the rock. The initially formed fractures or channels are then etended by the injection of fluids containing a propping agent to be deposited in the fractures. When the pressure is released, the propping agent deposited in the fractures hold the fractures open, leaving channels for reservoir fluid flow. The concentration of propping agent in the fluid is of significance because it determines the final thickness of the fractures. Typical prior art references disclosing such techniques include the following United States Patents: Bullen, U.S. Pat. No. 3,664,422, McKinnel, U.S. Pat. No. 3,561,533; Gomory, U.S. Pat. No. 3,363,691; Marx, U.S. Pat. No. 3,136,361; Zingg et al, U.S. Pat. No. 3,842,910; Henry, U.S. Pat. No. 3,245,470; Trott, U.S. Pat. No. 2,859,821; and Kerver et al, U.S. Pat. No. 3,138,205.

Hydraulic fracturing with foam, however, is only a recent development. A process using a foam composition to fracture is disclosed in the Blauer et al U.S. Pat. No. 3,937,283, in an article by Bullen appearing in the July 22, 1974 issue of "Oilweek" and a paper by Blauer and Kohlhaas entitled "Formation Fracturing with Foam" SPE 5003. These documents disclose a making of a fracturing foam by blending sand into jelled water and treating the slurry with a surfactant. The fluid pressure is increased with a conventional pump after which a gas, such as nitrogen or carbon dioxide, is injected into the fluid at which point a high pressure foam is created. This foam is then injected into the well. See also the Plummer et al U.S. Pat. No. 3,980,136.

The use of a foam as a fracturing fluid has a number of advantages. The foam has a low fluid loss and hence the fracture treatment is more efficient and since larger-area fractures are created with the same treatment volume, formation damage is minimized because little fluid invades the formation. Reduction of fracture conductivity is also minimized. Theoretically, the foam has a high sand-carrying and sand-suspending capability whereby a greater amount of sand will remain suspended in the fluid until the fracture starts to heal. Because more sand can be carried to the fracture, the propped fracture area to the created fracture area ratio theoretically approaches one. In addition, the sand does not settle quickly in the well bore during unplanned shut-downs during the treatment. The foam has a high effective viscosity permitting the creation of wider vertical fractures and horizontal fractures having greater area. The foam has a low friction loss which reduces the hydraulic horsepower necessary for injection and permits treatment of many wells down tubing. Since the foam has a low liquid content, the hydraulic horsepower necessary for injection is reduced which results in low hydrostatic head which, in turn, results in an underbalanced condition soon after opening the well thereby minimizing fluid entry and formation damage. Due to essentially zero fluid leakoff, a greater increase length of hydraulic fracture penetration into the formation is possible. Experience has shown that the cost for using foam for moderately deep wells is less than or the same as conventional techniques.

Unfortunately, the use of foam produced pursuant to the prior art has at least one major handicap, namely, the maximum proppant concentration obtainable is quite low. Conventional hydraulic fluids can achieve sand concentrations of 6 to 8 lbs. of sand per gallon of carrying fluid. Typical figures for concentration of proppant during the formation of the foam using a method taught in the Blauer et al patent includes a heavy gel with a maximum concentration of 6 to 8 lbs. of proppant per gallon of gel. However, when the liquid is foamed, the gas expends the liquid to approximately four times the original volume of gel. The net result is that the sand-foam concentration is reduced to about 2 lbs. per gallon. As a result, the conventional foam process is not as useful to industry as it could be.

Most of the conventional methods of fracturing use sand as a propping agent because of its availability, its low cost, ability to easily grade and size the sand particles, its chemical stability, its low interference with well activity, and its ability when in the crevices to withstand the tremendous pressures from the overburden when the fluid pressure is relieved. However, sand is also a highly abrasive substance and consequently specially designed equipment must be used. Rugged pumps and tanks are now available which can inject slurries with sand-fluid ratios as high as 9 lbs. per gallon. However, this concentration of sand is insufficient to provide a foam fracturing fluid that has the desired concentration of sand or propping agent. Because of the difficulty of pumping and otherwise handling large quantities and large flow rates of sand slurries, it is not possible to increase the initial sand concentration upstream of the pump to much greater than 8 lbs. per gallon. Thus, there is a great need and a large demand for a foam system for producing a foam fracturing fluid or slurry that has a high concentration of sand or other propping agent and for introducing the fracturing fluid at the high well head pressures required to cause fracturing.

Conventional concentrators or separators are well known in the art and include both vertical and horizontally disposed models. The former types are disclosed in the following United States patents: Lampen, U.S. Pat. No. 1,926,546; Bowden et al, U.S. Pat. No. 3,271,929; Stoddard, U.S. Pat. No. 3,583,910; Lowrie, U.S. Pat. No. 3,726,068; and Dudley, U.S. Pat. No. 3,850,814. The latter types are disclosed in the following United States patents: Cram, U.S. Pat. No. 2,718,179; Polleys, U.S. Pat. No. 2,791,158; Read, U.S. Pat. No. 3,399,773;

and Hickey, U.S. Pat. No. 3,828,929. None of these patents, however, disclose an apparatus for increasing the specific gravity of a slurry. The design of a slurry concentrating apparatus must account for the highly corrosive nature and high specific gravity of the slurry.

SUMMARY OF THE INVENTION

The present invention provides a concentrator usable in a system for producing a fracturing foam fluid with higher concentrations of proppant than were previously achievable. Such a system can achieve a foam having up to twice the proppant concentration as that presently obtainable from conventional approaches. However, a concentrator according to the present invention can also be used in other fields to both concentrate a slurry and to separate purer carrier from the bulk fluid, the use depending upon whether the desired output is the slurry or the carrier, respectively. In addition, the present concentrator could also find uses in separating a medium in a mixture of media where the media could be a liquid-liquid mixture, liquid-gas mixture, solid-gas mixture, and perhaps even a fluid-type solid-solid mixture.

Irrespective of the system with which the present concentrator is employed, the terms "mixture" and medium are used very broadly and the term "slurry" is also used in a broad sense to mean fluid mixtures which are generally comprised of solids and liquids, the liquids serving as the carrier for the solids. Such fluids are non-Newtonian in the sense that the consistency of the fluid is a function of shear stress as well as of temperature and pressure. It is believed that as thus defined, the slurries which can be concentrated by the present invention can include those non-Newtonian fluids, whose properties are independent of shear duration (e.g., Bingham plastic fluids such as sewage sludge, pseudoplastic materials such as suspensions of paper pulp, and dilatant materials such as quicksand), and those whose properties are dependent upon duration of shear (e.g., thixotropic fluids such as drilling muds and rheopertic materials such as gypsum suspensions in water).

Accordingly, it is an object of this invention to provide a concentrator for a system that requires a very dense fluid or fluid-like mixture. For example, such a system could use the mixture in hydraulic fracturing of a well to fracture, extend an existing fracture, or otherwise stimulate flow, drainage and productivity of subterranean formations. On the other hand, it is also an object of the present invention to provide a separator to remove one medium in a fluid mixture of media. For example, in the field of hydraulic fracturing, the present invention provides an apparatus in a fracturing system for producing a foam fluid having a high concentration of proppant. The system generally comprises the means for blending a proppant with a foamable carrier thereby forming a slurry, means for pressurizing the slurry to a desired pressure depending on the well depth, the geological area, the type of earth formation, and other injection criteria and means for introducing the pressurized slurry, or a part of it, into a centrifugal separator according to the present invention for separating out some of the carrier and thereby concentrating the amount of proppant per volume of slurry. The separator is used to remove an amount of the fluid carrier of the slurry until the desired proppant concentration is obtained in the concentrated slurry and to discharge the concentrated slurry. At some stage prior to the formation of foam, means are used to add a surfactant to the mixture and means are used to add a pressurized gas to the discharged, concentrated slurry, whereupon a pressurized foam is formed.

The present invention relates to an improvement in a concentrator for removing one medium (such as a carrier) of a mixture (such as a slurry) which comprises an elongate vessel having a mixture intake and a concentrated mixture outlet spaced downstream from the intake, and an outlet for the separated medium. A rotor rotatably mounted inside the vessel defines an annular or concentric channel between the vessel and the rotor in which the mixture being concentrated flows and the channel being in communication with the mixture inlet and extending to the concentrated mixture outlet. The rotor has an internal passageway and intake impeller means for removing the medium from the mixture in the annular channel to the internal passageway, and discharge means for discharging the removed carrier from the rotor passageway to the carrier outlet. The improvement comprises a seal between the rotor and the vessel located in the annular channel between the concentrated slurry outlet and the carrier outlet. In addition, the improvement in the concentrator comprises an intake impeller means that is comprised of a cylindrical impeller, on the one hand, or a stack of disk impellers in which solid flanged disks that extend radially beyond the inlets to the impellers are interspaced between these impellers.

A concentrator having a rotor seal results in a more efficient concentrator that can have a higher concentration in the discharged medium as a result of eliminating back flow of the separated medium. Furthermore, the seal has practically eliminated all carryover of the concentrated medium into the separated medium. The concentrator can also be made more economically and have a higher reliability because the discharge impeller means is no longer required to produce the required back flow patterns and therefore can be eliminated if desired. If the rotor seal is comprised of at least one relatively soft, rubbery sealing element and is an axial seal, a relatively large amount of rotor imbalance, shaft vibration, and shaft lateral movement can be tolerated. Obviously, this improvement results in a more economical and reliable concentrator.

A concentrator having a cylindrical intake impeller, is more efficient and reliable, and less expensive because there is less likelihood that the impeller intake channels will become clogged, it is much simpler to manufacture requiring only one impeller element instead of a plurality of disk impeller elements, and the intake impeller means (and hence the entire rotor) can be shorter with the same or even greater intake flow.

The foregoing system and apparatus have all the desirable properties for producing a significantly more concentrated slurry than that produced by conventional methods.

In another embodiment of the present invention, the rotor impeller means has channels therein with an outer inlet from the concentric channel and an inner outlet to the rotor passageway where the channels are configured so as to provide flow therethrough which approximates a free vortex flow pattern.

The foregoing system and apparatus have all the desirable properties for producing a significantly greater concentration of proppant in a high pressure slurry than that produced by conventional methods.

These and other features and advantages of the present invention will be set forth in or apparent from the detailed disclosure of the preferred embodiments hereinbelow.

BRIEF DESCRIPTION OF THE DRAWINGS

FIG. 2 is a schematic diagram of an alternative embodiment of a system used for creating and injecting foam into a well.

FIG. 3 is a schematic diagram of a third embodiment of a system used for creating and injecting foam into a well.

FIG. 5 is a front elevational view of an intake impeller on the rotor of the concentrator depicted in FIG. 4.

FIG. 6 is a cross-sectional view taken along line 6—6 of FIG. 5.

FIG. 7 is a front elevational view of a discharge impeller on the rotor of the concentrator depicted in FIG. 4.

FIG. 8 is a cross-sectional view taken along line 8—8 of FIG. 7.

FIG. 9 is a side elevational view in cross-section of a concentrator according to the embodiment of the invention as depicted schematically in FIG. 4, but with the inlets and outlets rotated so as to make them all visible in the view and with some parts removed for clarity.

FIG. 10 is an end elevational view of the concentrator depicted in FIG. 9 wherein the inlets and the outlets are shown in a presently desired configuration.

FIG. 11 is a cross-sectional view taken along lines 11—11 in FIG. 9, but with the rotor removed for clarity, in which the orifice is shown in detail.

FIG. 12 is a cross-sectional view taken along lines 12—12 in FIG. 11.

FIG. 14 is a side elevational view in cross-section of an alternative embodiment of a concentrator according to the embodiment of the invention as depicted schematically in FIG. 13, but with the inlets and outlets rotated so as to make them all visible in the view and with some parts removed for clarity.

FIG. 15 is an end elevational view of the concentrator depicted in FIG. 13 wherein the inlets and the outlets are shown in a presently desired configuration.

FIG. 16 is a side elevational view in cross-section of a further alternative embodiment of a concentrator according to the present invention, but with the inlets and outlets rotated so as to make them all visible in the view and with some parts removed for clarity.

DETAILED DESCRIPTION OF THE PRESENTLY PREFERRED EMBODIMENTS

Figure 1:
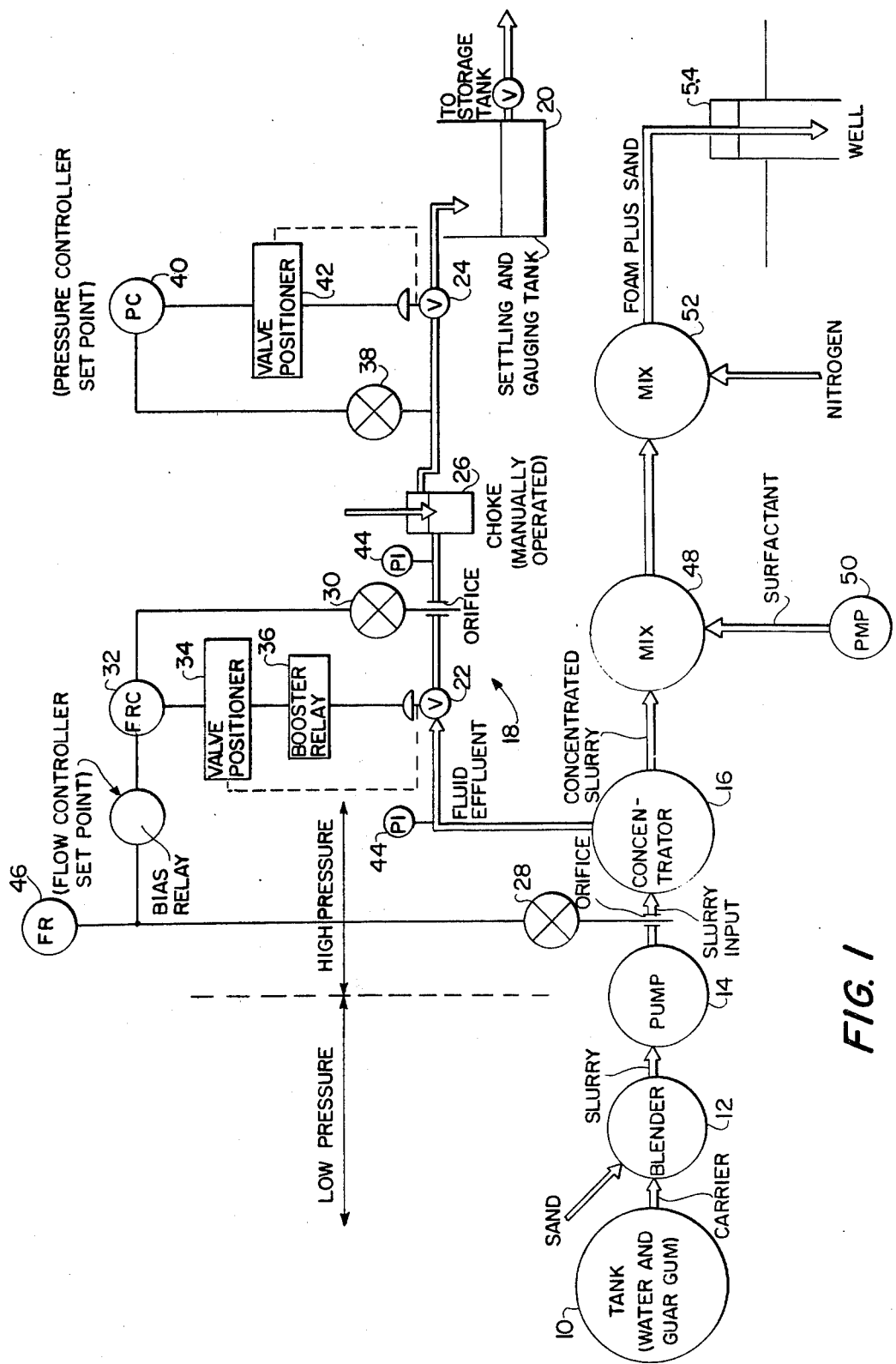
FIG. 1 is a schematic diagram of a system used for creating and injecting foam into a well.

With reference to the figures, wherein like numerals represent like elements throughout the several views, embodiments of a concentrator according to the present invention and method and apparatus using such a concentrator for formation fracturing with foam having a greater proppant concentration are depicted. With reference to FIG. 1, a flow chart of a particular embodiment of the formation fracturing method is depicted. A tank 10 stores a foamable carrier which may be a liquid, a gel, a colloidal suspension, or the like. In the present example, the carrier is comprised of water thickened with a guar gum at a concentration of 2 to 2.5 lbs. per 100 gallons of water. For the purposes of this specification, all units will be United States units unless otherwise indicated. The water-guar gum solution forms a gel, the viscosity of which depends on the rate of shear. The gel is classified as a non-Newtonian fluid with a plastic viscosity ranging from 10 to 30 centipoise.

A suitable proppant is added to a blender 12 which takes a suction on tank 10. The presently preferable proppant is 40 to 60 screen sand. However, other proppants which can be used can include glass, plastics, and metal particles. The shape of the proppant particles can be spherical, ellipsoidal, or irregular. The output of the blender is a slurry which is then fed to a high pressure injection pump 14. The concentration of the proppant or sand is typically from 6 to 8 lbs. of sand per gallon of carrier. Pump 14 is a conventional pump and raises the pressure of the slurry to at least the required well head pressure.

The pressurized slurry is then fed into the input of a separator or concentrator 16 which increases the proppant-slurry ratio by "dehydrating" the slurry. Concentrator 16 segregates a fraction of the carrier and discharges it via a pressure reduction system 18 to a settling tank 20 which is at atmospheric pressure and from which it can be sent to a storage tank (not shown). The remaining fraction of the input to concentrator 16 is discharged therefrom as a concentrated slurry. As an example, the slurry from the discharge of concentrator 16 can have from 12 to 15 lbs. of proppant or sand per gallon of fluid.

Pressure reduction system 18 comprises a throttling valve system which must reduce the pressure of the carrier from a high level of from 2,000 to 6,000 psig to near atmospheric pressure. Although this large amount of pressure drop can present problems in valve wear and noise control, conventional commercial equipment is available for performing this function. An automatic, two stage valve system is disclosed in FIG. 1 and comprises a first reduction valve 22 and a second reduction valve 24 with an intermediate, manually operated throttling valve 26. It is preferable that the reduction and throttling valves have ceramic chokes. The discharge pressure of first reduction valve 22 is automatically controlled by signals generated by an upstream differential pressure transmitter 28 and a downstream differential pressure transmitter 30. An electrical output signal is generated by upstream transmitter 28 and is sent through a bias relay to a three-mode flow controller 32 which also receives the electrical output signal from transmitter 30 directly. An electrical signal from flow controller 32 operates a valve positioner 34 which in turn is mechanically coupled to first reduction valve 22. In addition, valve positioner 34 generates an electrical signal which is sent to a booster relay 36 which in turn is electrically coupled to first reduction valve 22 for providing a more rapid initial response of the valve. Second reduction valve 24 requires a much simpler control system. A differential pressure transmitter 38 generates an electrical signal which is coupled to a three-mode pressure controller 40. Pressure controller 40 generates a valve control signal which is fed to a valve positioner 42 that in turn is both electrically and mechanically coupled to second reduction valve 24 for the positioning thereof. Various pressure indicators 44 and a flow recorder 46 are used to monitor the operation of the pressure reduction system 18.

In order to reduce the surface tension of the concentrated slurry discharged from concentrator 16, a conventional surfactant is injected at a mixing junction 48 with a conventional, high pressure injection pump 50. The particular surfactant or surface active foaming agent utilized will, of course, depend upon the carrier and the type and character of the formation. Examples of conventional surfactants are disclosed in the Blauer et al patent referred to hereinabove. At a point downstream of surfactant mixing junction 48, a second mixing junction 52 is used for the introduction of the foam generating gas. The gases utilizable in the present invention include nitrogen, carbon dioxide, air hydrocarbon gases, and the "inert" gases such as argon, helium, krypton and xenon. A large amount of gas at high pressure must be used for the production of foam, which is produced at the point where gas is added. The foam is then introduced into a well 54. Foam injection rates are approximately 4 to 5 times the volume of fluid supplied to pump 14.

In an alternative embodiment of a foam injection system, shown in FIG. 2, the high pressure slurry output from pump 14 is divided into two parts, a first part being fed to a concentrator or separator 56. A portion of the carrier is separated from the slurry in concentrator 56 and is discharged through a throttling valve 58 back to tank 10. The foaming gas, such as nitrogen, may be introduced into separator 56. The second part of the slurry bypasses separator 56 and is sent to a mixing junction 60 where surfactant is added. The surfactant-slurry mixture is then combined at a mixing juncture 62 with the concentrated slurry-nitrogen mixture discharged from separator 56. Additional nitrogen is added at mixing juncture 62 to yield the desired quality foam which is then piped into the well. The proppant concentration in the concentrated slurry is regulated by controlling the carrier recycling rate using throttling valve 58.

A third embodiment of a foam injection system is shown in FIG. 3 wherein a hydraulic motor 64 is used to depressurize the recycled carrier. A manually operated control valve 66 can be used to control the concentration of the proppant in the slurry discharged from separator 56. One way of reducing the power requirement would be to have hydraulic motor 64 control a second injection pump 68 which is in parallel with the principal injection pump 14. The system disclosed in FIG. 3 is similar to that disclosed in FIG. 2 in all other respects.

It is noted that FIGS. 1, 2, and 3 depict the surfactant as being added in the high pressure part of the system. However, if the injection pump and the concentrator are sufficiently gas free, the surfactant can be added in the low pressure side of the system. The only advantage of adding the surfactant on the high pressure side of the system downstream of the concentrator or separator is that foaming is prevented in the injection pump or in the concentrator or separator. Naturally, a high pressure injection pump must be used to inject the surfactant on the high pressure side which in turn adds to the cost of the system.

With reference now to FIGS. 4-8, a concentrator according to the present invention usable in the aforedescribed formation fracturing systems is disclosed at 16. Concentrator 16 receives a high pressure slurry at an inlet or intake 70 located at the forward end thereof from a slurry storage tank 10 through a high pressure injection pump 14. If desired, a mixing line 72 can be connected through a valve 74 to the discharge of pump 14 and supply a small quantity of slurry back to tank 10 to ensure that the proppant does not settle out of the carrier. Concentrated slurry is discharged from concentrator 16 at a slurry outlet 76. A substantially proppant free carrier is discharged from concentrator 16 at a carrier outlet 78.

Concentrator 16 is comprised of a substantially horizontally extending, substantially cylindrical vessel 80 having forward and rearward hydraulic seal chambers 82 and 84, respectively. A rotor 86 is rotatably mounted inside vessel 80 on a shaft 88 that is journalled inside seal chambers 82 and 84. A high torque developing motor 90 is connected to shaft 88 for rotating rotor 86 at operating speeds which can be from 1600 to 2000 r.p.m. Rotor 86 in turn comprises a substantially cylindrical stabilizer 92 at the forward end thereof, a plurality of intake impellers 94 downstream of stabilizer 92, a plurality of discharge impellers 96 spaced downstream from intake impellers 94 and an internal passageway 98 in fluid communication from intake impellers 94 to discharge impellers 96. Rotor 86 and the circular walls of vessel 80 define an annular concentric channel 100, through which the concentrated slurry is accumulated and into which slurry outlet 76 is tangentially connected.

Stabilizer 92 has two basic functions, to impart a spin to the incoming slurry through frictional contact and to dampen torsional vibrations of the rotor and shaft by the frictional torque exerted by the rotor. Stabilizer 92 preferably has a rubber cover to resist abrasion and a plurality of longitudinal or axial grooves therein to increase surface area and improve traction. The spin induced by stabilizer 92 develops sufficient centrifugal force on the proppant in the slurry to initiate the proppant separation process before the slurry reaches the intake impellers 94. This provides a boundary layer of carrier largely free of proppant and helps to protect the intake impellers from contact with an excessive quantity of the abrasive proppant.

Intake impellers 94 consist of a plurality (for example 15) of individual impellers 102 which can be of the type shown in FIGS. 5 and 6. Each impeller 102 has a plurality of axially extending orifices 104 spaced about the outer part of the circumference thereof. Orifices 104 receive stabilizing rods (not shown) which extend through all of the individual impellers and thereby permit all of the impellers 102 to rotate together. A large, central orifice 106 in impeller 102 permits the impeller to be mounted onto shaft 88. A plurality of inner orifices 108 shaped as segments of a circle and circumferentially spaced about central orifice 106 extend completely through impeller 102 and provide an axial fluid course or channel for the separated carrier. The size of the inner orifices 108 must be sufficient to handle the required volume of effluent carrier flow at reasonable fluid velocities. A plurality of spaced apart vanes 110, preferably equal in number to the number of inner orifices 108 spiral outwardly from the outer periphery of inner orifices 108 in a direction opposite the direction of rotation indicated by arrow 112 to the outer periphery of impeller 102. Vanes 110 define a plurality of shallow (e.g., ¼ inch), outwardly spiralling intake channels 114 for permitting a fraction of the intake slurry to be admitted therein. Intake channels 114 spiral in a direction opposite the rotation of impeller 102 so as to discourage the admission of proppant. On the one hand, intake channels cannot be so small as to get plugged with fine or course proppant, yet on the other hand must have a large enough cross section so as to guide the slurry effectively. The total cross sectional area of all of intake channels 114 in all of impellers 102 must also be appropriately sized for the rated flow therethrough and hence the flow through concentrator 16. The flow through intake channels 114 is indicated by dashed line 116. Finally, a plurality of spokes 118 emanate radially outwardly from central orifice 106 to vanes 110 and function not only as supporting members for impeller 102, but also for providing increased fluid traction and the torque supplied to the fluid contributes to the rotational strength of the fluid vortex system.

Discharge impellers 96 comprise a plurality of individual impellers 120 as shown in FIGS. 7 and 8. Impeller 120 is comprised of the same elements as intake impeller 102, albeit different in number and shape, and are denoted by the primed number that is the same as the corresponding element in the intake impeller 102. Discharge impeller 120 rotates in the direction shown by arrow 122 and has a fluid flow outwardly as shown by arrow 124. Discharge impeller 120 also differs from intake impeller 102 in that the former has a larger diameter so as to provide the required discharge head. Exemplary diameters of intake and discharge impellers 102 and 120 are 4½ inches and 5 inches, respectively, each with a nominal thickness of ½ inch and each with fluid passages or channels of ¼ inch in depth. The impeller faces can be molded from epoxy with the mating faces of adjacent impellers ground true. An exemplary number of discharge impellers 120 can be 14 or 15.

It may also be desirable to locate a small propeller at the upstream end of intake impellers 94 so as to provide axial thrust. In addition, a rubber annular restrictor 126 can be located immediately downstream of the slurry outlet 76 so as to form an orifice and thereby restrict axial flow to a small annular space around rotor 86. By restricting the axial flow area beyond slurry outlet 76, the wash of fluid from discharge impellers 96 should be sufficient to check the axial momentum of proppant and thereby limit the amount of proppant discharged with the carrier. A plurality of deflector fins 128 mounted between intake impellers 94 and discharge impellers 96 are perforated and are to impart additional spin to the concentrated slurry at the discharge and check the axial momentum of the proppant. An axial vane 130, pivotally mounted with a shaft extending through the wall of vessel 80 is located in the annular space just downstream of slurry discharge or outlet 76 and is useful for controlling the volume of carrier washing past restrictor 126 from discharge impellers 96.

Concentrator 16 also has a valved recycle line 132 tangentially entering vessel 80 opposite discharge impellers 96 at one end and upstream of stabilizer 92 at the other end. Recycle line 132 provides a means for washing axial channel 100 with an increased volume of flow to prevent plugging thereof with solids.

Concentrator 16 can be used in a horizontal orientation, can be equipped with adjustable legs at the motor 90 end thereof so that it can be inclined at the forward end, and in some embodiments can be used in the vertical or any intermediate orientation. Exemplary specifications of concentrator 16 when used in a formation fracturing system can include a working pressure of 5,000 psig, a maximum input slurry rate of 210 gpm having an input concentration of 4 to 8 lbs. per gallon. An output concentration of proppant in the concentrated slurry can be expected to be greater than 12 lbs. per gallon.

In operation, in a formation fracturing system, concentrator 16 has slurry fed into inlet 70 which preferably is tangentially connected. The pressure inside concentrator 16 is maintained by controlling the input and output fluid flows. A fraction of the input slurry is induced to flow radially inwardly entering intake impeller 94 through intake channels 114. The fluid within the rotor is induced to flow axially along and through inner orifices 108 toward discharge impellers 96. Fluid flows out of discharge impellers 96 through discharge channels 114' into a rearward part of annular channel 100. As the fluid is flowing through inner orifices 108, any proppant still therein is forced radially outwardly back into axial channel or annulus 100. Slurry at a concentration increased by the withdrawal of carrier flows axially along axial channel 100 toward slurry outlet 76. Deflector fins 128 increase the angular velocity of the concentrated slurry in the vicinity of slurry outlet 76 and particles of the proppant impinging on the deflector fins lose axial momentum. Flexible restrictor 126 also serves as a guide to deflect proppant toward slurry outlet 76. A part of the flow from discharge impellers 96 is removed as carrier effluent, a part is recycled in recycle line 132, and the residual flow from discharge impellers 96 washes back to slurry outlet 76 where it is discharged with the concentrated slurry. The purpose of the residual flow is to limit flow of the slurry past restrictor 126 and out carrier outlet 78. On the other hand, the residual flow must be designed to be as little as possible so that there is minimal dilution of the concentrated slurry.

Now that the concentrator according to the present invention has been described with respect to one general embodiment, the general theory behind the construction of the present invention will now be discussed. Referring to FIG. 19a, a fluid particle is depicted moving along a streamline at position $\bar{r}$, with velocity $\bar{v}_r$ relative to the impeller rotating at a constant rotational speed $\omega$. The flow rate, q, through the impeller is constant. The effective depth of the water passages is b and the radial thickness of the impeller is $r_2-r_1$. The particle is subjected to a radial velocity u, a tangential velocity v, a velocity relative to the rotating impeller $v_r$, and an acceleration a. The fluid particle is located at an angular position $\phi$, has a Mass m and is subjected to a torque T (in foot-pounds). Those symbols having an overline represent the vector quantity and those without the overline represent the scalar quantity.

The classical equation in mechanics for the acceleration of the particle with respect to a fixed, non-rotating reference frame (e.g. the stationary vessel) is given as follows realizing that impeller rotation $\omega$ is constant and hence angular acceleration is zero and that $\bar{\omega} \cdot \bar{r}=0$:

$$\bar{a} = \frac{\partial^2 \bar{r}}{\partial t^2} - \omega^2 \bar{r} + 2\bar{\omega} \times \frac{\partial \bar{r}}{\partial t}; \tag{1}$$

where the first term is the acceleration of the particle with respect to the rotating reference frame, the second term is the centripetal acceleration and the final term is the Coriolis acceleration.

Using the D'Alembert's principle concerning inertia moments and equation (1), the torque on the particle is given as follows:

$$T = \int \left[ \left[ \bar{r} \times \frac{\partial^2 \bar{r}}{\partial t^2} \right] + 2 \bar{r} \times [\bar{\omega} \times \bar{v}_r] \right] dm; \tag{2}$$

where the first term is the torque due to acceleration with respect to the rotating reference frame (ie., the impeller) and the second term is the torque component due to Coriolis acceleration, and where the cross product of the radius $\bar{r}$ with the centripetal acceleration is zero. Equation 2 can be rewritten using polar coordinates, integrating over all annular elements between $r_1$ and $r_2$, and using the following relationships:

(3) $u = q/2\pi rb$
(4) $dm = 2\pi rb\rho dr$ ($\rho$ being the density), as follows:

$$T = \frac{\rho q^2}{2\pi b} \left\{ r d\left[\frac{d\phi}{dr}\right] + d\phi \right\} + \{\rho q\omega(r_2^2 - r_1^2)\}; \tag{5}$$

where the first term depends on blade curvature and the second term represents the torque due to Coriolis acceleration. For example, if $$\frac{d}{dr} \left[ r \frac{d\phi}{dr} \right] = kr,$$

k being a constant, the first term, denoted $T_1$, of equation 5 becomes:

$$T_1 = \frac{\rho q^2 k}{4\pi b} [r_2^2 - r_1^2] \tag{6}$$

and $$\phi = \frac{1}{4} k(r_2^2 - r_1^2) + c \ln \frac{r_2}{r_1} \tag{7}$$

where c is a constant of integration.

To calculate the radial power, p, the following relationship is used: $p = \bar{F} \cdot \bar{u}$; where $\bar{F}$ is the force. Neglecting frictional force, there are four radial acceleration components which act on a particle moving within the impeller and these determine the inertial forces acting on the particle. These are: (1) where the cross sectional area for flow increases with the radius; (2) where the fluid particle has an angular velocity with respect to the rotating impeller reference frame thereby yielding a centripetal acceleration; (3) the component associated with a Coriolis acceleration; and (4) the component due to acceleration of the rotating reference frame (i.e., centripetal acceleration). In general, these radial powers (which should be multiplied by 550 for horsepower), can be calculated by the following equations which are derivable using the foregoing considerations:

$$p_1 = \frac{\rho q^3}{8\pi^2 b^2} \left[ \frac{1}{r_2^2} - \frac{1}{r_1^2} \right] \tag{8}$$

$$p_2 = -\frac{\rho q^3}{4\pi^2 b^2} \left[ \frac{d\phi}{dr} \right]^2 \frac{dr}{r} \tag{9}$$

$$p_3 = -\frac{\rho q^2 \omega}{\pi b} d\phi \tag{10}$$

$$p_4 = -\frac{\rho q \omega^2}{2} [r_2^2 - r_1^2] \tag{11}$$

Note that equations 8 and 11 are general, but equations 9 and 10 are dependent on the blade characteristic. Thus, for example, using the same blade characteristic used above to obtain equations 6 and 7 (and which resulted in an impeller similar to that shown in FIG. 5), the following equations result:

$$p_2 = \frac{\rho q^3}{4\pi^2 b^2} \left[ \frac{1}{8} k^2 (r_2^2 - r_1^2) + kc \ln\left(\frac{r_2}{r_1}\right) - \frac{c^2}{2} \left( \frac{1}{r_2^2} - \frac{1}{r_1^2} \right) \right]; \tag{12}$$

and $$p_3 = -\frac{\rho q^2 \omega}{\pi b} \left[ \frac{1}{4} k (r_2^2 - r_1^2) + c \ln\left(\frac{r_2}{r_1}\right) \right]. \tag{13}$$

Figure 17:
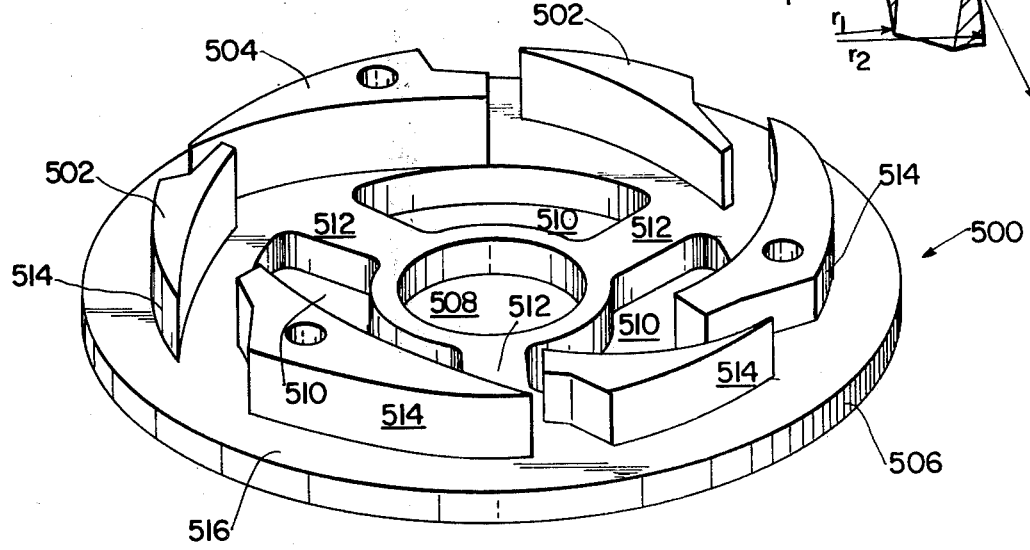
FIG. 17 is a perspective view of one inlet impeller disk usable in the concentrators depicted in FIGS. 9 and 14 and with other such disks as a replacement for the impeller means depicted in FIG. 16.

The preliminary specification for impeller size and numbers, in the case of impellers such as those depicted in FIGS. 6, 7 and 17, are determined as mentioned above with respect to volume of effluent flow, rotational speed, and structural integrity, to name a few. The two integration constants used for the disk impeller depicted in FIGS. 5 and 6 where the inner radius was 1.8 inches and the outer radius was 2.25 inches are: $k = 414.4°/\text{in}^2$; and $c = 1049.0°$. With these figures plus using the number of water courses per impeller and the angular displacement of each water course, a general purpose digital computer can be easily programmed to obtain the angular displacement and radii for the impeller. Having established the curature parameters for the intake impeller, if discharge impellers are used, those parameters can be similarly obtained. From here, the torque due to water course curvature can be established using equation 6 and the Coriolis torque can be established using the following equation:

$$T_2 = \rho q \omega (r_2^2 - r_1^2)$$

Similarly, the power required for radial thrust in the pump system and the torque input can be calculated.

Underlying the above calculations is the principle that the impeller according to the present invention is designed so that a free vortex condition is achieved. In a free vortex condition, the velocity (V) of a particle at any particular radius (R) is inversely proportional to that radius, i.e.,:

(14) $V = K/R$; where K is a constant of proportionality. Therefore, the centrifugal force on the particle is:

(15) $F = mk^2/R^3$; "m" being the mass of the particle. Thus, the centrifugal force on a particle in a free vortex increases rapidly by the inverse cube of the radius as the particle moves towards the center of the vortex. On the other hand, in a forced vortex the velocity of the particle at any radius is proportional to that radius and the centrifugal force on that particle is also proportional to the radius. Thus, a free vortex is obviously a much more desirable condition for separating liquids from a slurry such as a guar gum carrier from a well fracturing fluid. Such a consideration also leads to the conclusion that the liquid carrier of the slurry should be drawn off from the center of a centrifugal machine and the slurry should enter the machine at the perimeter of the stationary vessel, contrary to the conventional type of centrifugal separator.

An inlet impeller means designed pursuant to the forefoing calculations results in the liquid carrier passing through the impeller so as to increase the velocity thereof tangential to the impeller. This results in the fluid following a path through the impeller which approximates a spiral path. Thus, as shown in FIG. 5, an angle $\theta$ between a line drawn through the center of intake impeller 94 and a line drawn through the center of each passage should be as large as possible. Because of structural considerations, the angle $\theta$ in FIG. 5 is approximately 60°. Also, the intake channel 114 decreases in cross sectional area from the outer inlet thereof from annular channel 100 to the inner outlet thereof to inner orifices 108 of impeller 102. This intake channel design forces the carrier liquid of the slurry to increase its velocity as the liquid progresses through the impeller. The velocity of the carrier liquid is also increased as a result of the spiral or curvature of intake channel 114 being in an angular direction opposite the normal forward rotational direction of the rotor because the liquid must have a greater angular velocity than the rotor in order to enter the inlet plenum of intake channel 114.

Figure 18:
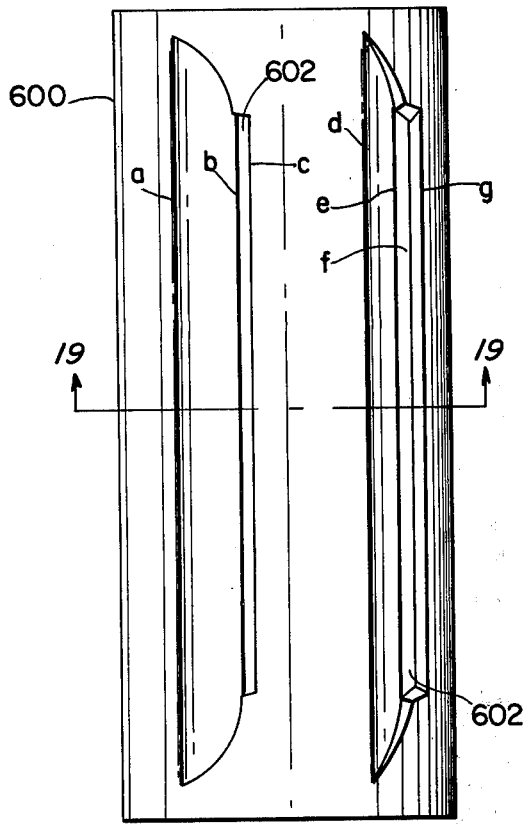
FIG. 18 is a side elevational view of an alternative embodiment of an inlet impeller means which comprises an inlet impeller cylinder depicted in FIG. 16 and which has been adapted from a photograph of an actual cylinder.
Figure 19:
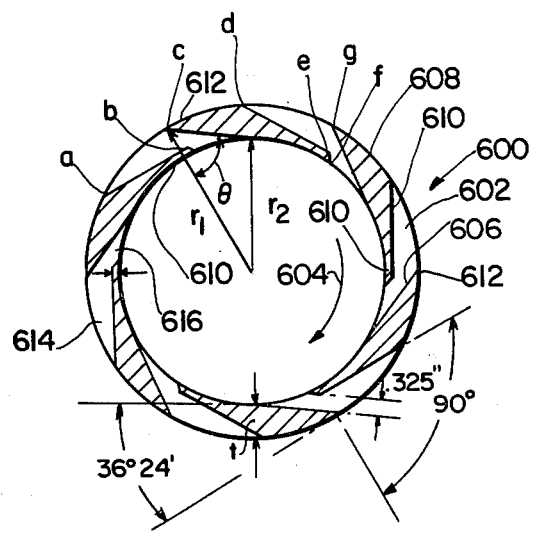
FIG. 19 is an engineering type drawing of a cross-sectional view, rotated somewhat, taken along lines 19—19 of FIG. 18.
Figure 19A:
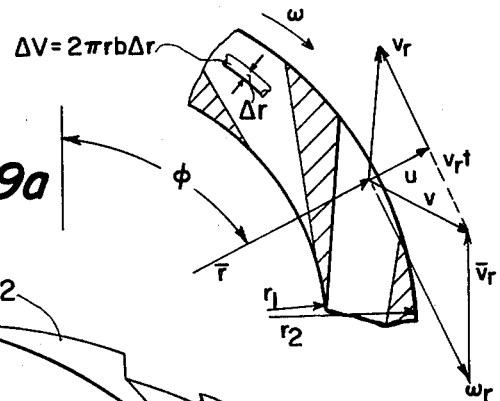
FIG. 19a is an enlarged portion thereof.

In other impeller designs according to the present invention, such as those shown in FIGS. 17, 18 and 19, the intake channel length is rather small compared to the overall impeller radius (which in these embodiments is also coupled with a relatively small impeller $\Delta r$, where ($\Delta r = r_2 - r_1$)). From experimentation, it was found that the carrier flow increased as the channel length decreased so long as the carrier flow had a tangential velocity component. In other words, carrier flow increased with decreasing channel length until there was a direct radial flow path from the outer perimeter of the impeller to the inner channel thereof.

Figure 4:
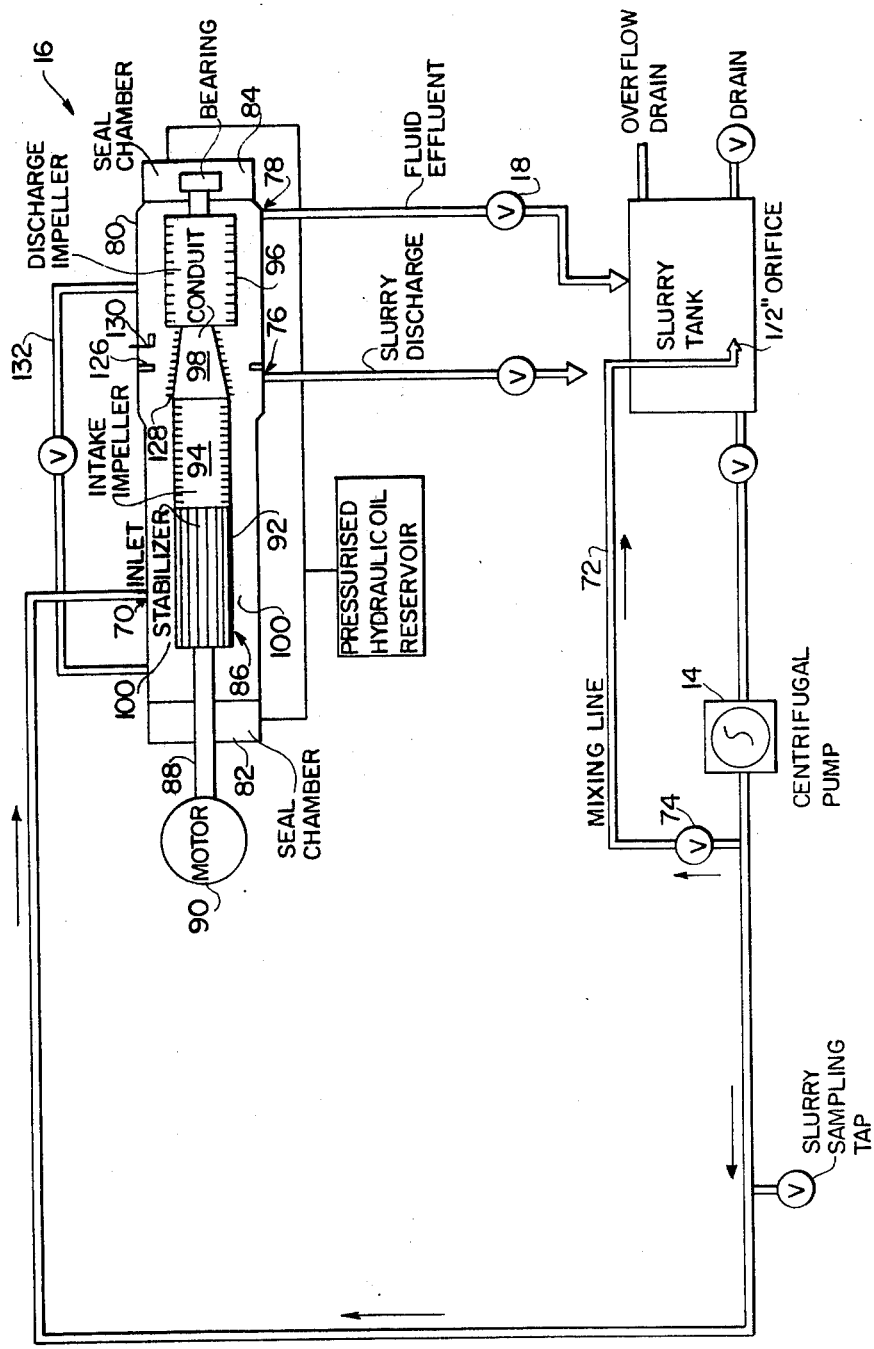
FIG. 4 is a schematic diagram of a separator or concentrator according to one embodiment of the invention for increasing the concentration of proppant in the slurry prior to the foaming of the slurry.

Referring now to FIGS. 9 and 10 of the drawings, the first embodiment of a concentrator according to the present invention is depicted in much greater detail than that shown in FIG. 4. It is noted further that FIGS. 9 and 10 are engineering-type drawings drawn approximately to scale. Vessel 80 is a substantially cylindrical vessel having a nominal six inch diameter at the forward part thereof, denoted 134, and at the downstream, rearward end part, denoted 136. At each end of vessel 80 are integral flange portions 138 and 140, respectively located at the forward and rearward ends thereof, which are provided around the periphery thereof with a plurality of drilled bolt holes 142 so that shaft seals can be rigidly mounted thereat, only one shaft seal being shown at 144. Shaft seal 144 is of conventional design and need not be described any further. Adjacent to rear end part 136 is an enlarged portion of vessel 80 which has a nominal diameter of 8 inches and is connected to the 6 inch diameter portions of vessel 80 through two similar 8 inch by 6 inch by 0.188 reducers 148 and 149. Slurry inlet or intake 70, slurry outlet 76, and carrier outlet 78 are tangentially arranged around vessel 80 in the direction of rotor rotation, shown by arrow 150 (see FIG. 10). Similarly, an inlet 152 and an outlet 154 for recycle line 132 are tangentially arranged on vessel 80 in the direction of normal rotor rotation. Nominal internal dimensions for the connections to vessel 80 are as follows: Slurry inlet 70, slurry outlet 76, carrier outlet 78, and recycle outlet 154 are 2 inches; and recycle inlet 152 is 1 inch. In one embodiment of vessel 80, the axial length between the ends of flange portions 138 and 140 is 56.65 inches. The wall thickness and the material from which vessel 80 is made are not critical and only must meet the nominal working pressures with which concentrator 16 is used.

Concentrator 16 also comprises shaft 88, a motor 90 for rotating said shaft (FIG. 4), elongate rotor 86 and an annular orifice defining member 156 located between slurry outlet 76 and carrier outlet 78 for limiting flow of the concentrated slurry past slurry outlet 76 and into carrier outlet 78. Also, the location of recycle outlet 154 between carrier outlet 78 and slurry outlet 76 and on the upstream side of reducer 149 helps to prevent slurry carry-over into carrier outlet 78 by removing any proppant which travels beyond orifice defining member 156 and recycling it to the upstream end of concentrator 16. In this regard, reducer 149 also acts as a means for limiting the slurry carry-over as a result of the reducer causing an increase in velocity of the fluid flowing downstream therebeyond. Any proppant backing up at reducer 149 will tend to be caught in the wash of the carrier exiting discharge impeller 96 and forced into recycle outlet 154, as mentioned above. Finally, through proper operating parameters, wash from discharge impeller 96 should flow upstream past orifice defining member 156 and out slurry discharge 76, thereby further limiting slurry carry-over.

Shaft 88 is made of solid steel without any indentations or cut away areas so as to provide better balance and extends the entire length of vessel 80, protruding therefrom at each end thereof through shaft seals 144, as mentioned above. Rotor 86 consists of a plurality of individual parts that are pressed and bolted together and rigidly mounted to shaft 88 at each end with two similar split tapered bushing assemblies 158 which are press fitted onto shaft 88. In this manner, keyways in shaft 88 are not required thereby permitting an easier balancing of shaft 88. Bushing assemblies 158 are conventional and each comprises a split taper bushing 160, a key 162 for attaching the two halves of bushing 160, and a steel hub 164 that is keyed with a key 166 to bushing 160. A hub protector 168, comprised of an abrasion resistant rubber cover 170 comprised of, for example, 60–65 DUROMETER rubber which is bonded to a steel washer 172 having a 0.06 nominal thickness, serves to protect bushing assembly 158 and the rotor components to which they are attached from the highly abrasive action of the slurry.

As mentioned above, rotor 86 comprises the following elements going from the upstream end to the downstream end thereof: stabilizer 92; intake impellers 94; a rotor housing 174 which defines internal passageway 98; and discharge impellers 96. Each of these components are bolted to the adjacent component, and the end components, namely stabilizer 92 and discharge impellers 96, are bolted to hub 164 of bushing assembly 158 with bolts 176 and torque rods 178, respectively.

Stabilizer 92 preferably comprises a hollow steel cylinder 180 having a ½ inch thick rubber sleeve of 60–65 DUROMETER rubber, for example, force-fitted around cylinder 180 and resiliently held in place, and a forward and a rearward hub plate 184 and 186, respectively. Rubber sleeve 182 can also be bonded onto cylinder 180 and has a plurality of 0.175 deep by 0.275 wide grooves cut therein. Cylinder 180 is force-fitted onto, and can be welded to, hub plates 184 and 186. Forward hub plate 184 has a larger diameter than stabilizer 92 and is provided with a plurality of orifices around the perimeter thereof so it can be bolted to hub 164 with bolts 176 as mentioned above. Rearward hub plate 186 has a diameter equal to the inner diameter of cylinder 180 and is in turn bolted with bolts 188 to forward impeller 94.

Intake impeller 94 is comprised of a plurality of individual impeller disks which can be of the type shown in FIG. 5 or of the type to be described hereinbelow and shown in FIG. 17. As mentioned above, the number of impeller disks which are used depends upon the flow criteria of concentrator 16 and the individual flow through each impeller disk. The stack of impeller disks are held together by a forward hub plate 190 and a rearward hub plate 192 and a plurality of torque rods 194, threaded at each end, which extend through each impeller disk and the two hub plates and are retained therein by internally threaded, epoxy covered caps 196. As mentioned above, forward hub plate 190 is bolted, with bolts 188, to rearward hub plate 186 of stabilizer 92. Rearward hub plate 192, is in turn, force-fitted onto, and welded if desired, to rotor housing 174.

Rotor housing 174 serves two functions, to provide a sealed, internal fluid passageway from intake impeller 94 to discharge impeller 96, and to keep the concentrated slurry travelling through annular channel 100 spinning so that the slurry is directed into and discharged through slurry outlet 76. Rotor housing 174 is comprised of two cylindrical shells, a smaller forward shell 198, the forward end of which is force-fitted onto an annular rim 200 of rearward hub plate 192 (and can be welded thereto) and a larger rearward shell 202 which is provided with a rearward end flange 204 having a plurality of orifices around the periphery thereof so that it can be bolted thereat to discharge impeller 96. The rearward part of shell 198 is telescopically received by the forward part of shell 202 and is bolted thereto with bolts 206. Shell 202 has a tapered rearward portion 208 and a cylindrical forward portion 210 which join together and provide a radial ridge 212. A plurality of annular rubber disks 214 interspersed with a plurality of rubber spacers 216 are stacked between ridge 212 and a snap ring 218 retained within a groove provided together therefor in cylindrical portion 210. Disks 214 eliminate any axial flow along the surface of rotor 86 in the vicinity of the inlet to slurry outlet 76. If desired, disks 214 can have axial orifices therethrough to ensure that a rotational spin is given to the concentrated slurry. Exemplary dimensions for disks 214 are a diameter of 6½ inches and a thickness of 0.25 inches. As seen in FIG. 9, the forwardmost disk 214 is axially located on rotor 86 such that the periphery thereof will almost be in contact with the wall of reducer 148. Obviously, rear hub plate 192 and flange 204 of shell 202 have been provided with internal orifices sufficiently sizes so as not to interfere with the flow of the separated carrier.

Discharge impeller 96, similar to intake impellers 94, is comprised of a plurality of disk impellers which are stacked between flange 204 and a hub 220 that is similar to hub 164 of bushing assembly 158. Hub 220 has a plurality of orifices around the periphery thereof for receiving torque rods 178, which can be identical to torque rods 194 and serve the same purpose. Likewise, bolts or torque rods 178 have threaded caps 196 on the ends thereof. Alternatively, caps 196 can be force fitted and welded or glued onto the ends of the torque rods.

Orifice defining member or restrictor 156 is disclosed in greater detail in FIGS. 11 and 12 in a presently preferred embodiment. Member 156 is comprised of four overlapping, annular segment vanes 222 which are bolted together with bolts 224 as shown in FIG. 12. Each vane 222 is similarly mounted in vessel 80 and therefore only one will be described. A ½ inch orifice 226, drilled into the side of vessel 80, receives one end of a one-quarter inch bolt 228, the other end of which is securely fastened to vane 222, for example, by being welded thereto. A ½ inch washer and nut combination, shown at 230, securely and rigidly mounts vane 222 to vessel 80. Water tight integrity of vessel 80 is maintained and access to nut and washer 230 is obtained with a capping assembly 232. Capping assembly 232 comprises a one inch thread-O-let 234 welded at one end to vessel 80 over orifice 226, a threaded, one inch close nipple 236 threaded into thread-O-let 234 at one end, and a cap 238 threaded onto the other end of nipple 236. Alternatively, orifice defining member 156 can be comprised of four vanes which do not overlap and are not connected together. In either case, vane 222 is preferably made of a steel that can withstand the abrasive nature of the slurry and which has a thickness so that its dimensional integrity will be maintained at the high pressures and the flow rates which exist in concentrator 16.

A first embodiment of a concentrator according to the present invention and as depicted in FIG. 4 has now been described in detail with respect to FIG. 9. The operation of concentrator 16 has been described hereinabove. In the detailed drawing of concentrator 16 in FIG. 9, vessel 80 has at least one flanged opening 240 and an access cover 242 removably mounted thereto so as to provide access to intake impeller 94. Obviously, other access openings or hand holes can be provided in vessel 80 as desired. Similarly, the dimensions mentioned above regarding concentrator 16 are only exemplary and would vary depending upon the particular operational requirements for concentrator 16.

Figure 13:
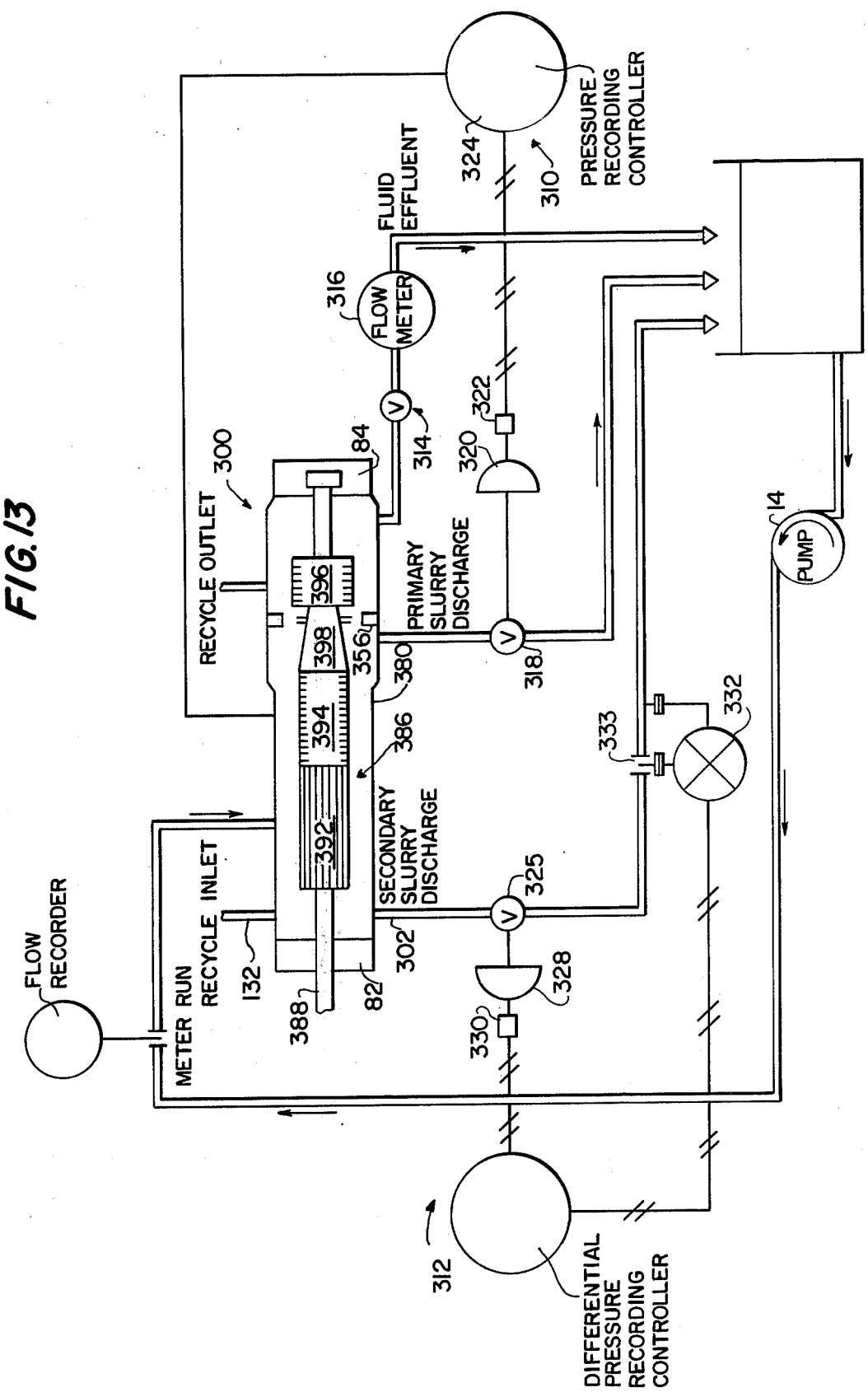
FIG. 13 is a schematic diagram of a concentrator according to an alternative embodiment of the invention.

A second embodiment of a concentrator, denoted 300, according to the present invention is depicted in FIGS. 13, 14 and 15. Concentrator 300 is very similar in principle to concentrator 16, depicted in FIG. 9, and similarly comprises a substantially horizontally extending vessel 380 and an elongate rotor 386 mounted on a shaft 388 which in turn is rotatably mounted in concentrator 300. Rotor 386 comprises a stabilizer 392, a plurality of intake impellers 394, discharge impellers 396 and a hollow housing 374 for providing an internal passageway 398 between intake impeller 394 and discharge impeller 396. Vessel 380 also has a mixture inlet 370, a concentrated mixture outlet 376, and a separated medium outlet 378. Similarly, concentrator 300 has a recycle inlet 352 and a recycle outlet 354. In addition, concentrator 300 is comprised of a vessel 380 which has a forward part 334 and a rearward part 336 both with a nominal 6 inch diameter and an enlarged portion 346 having a nominal diameter of 8 inches and joined to the forward part 334 and rearward part 336 with respective reducers 348 and 349. Also, the length of concentrator 300 is the same as the length of concentrator 16 depicted in FIG. 9.

There are, however, significant differences between the concentrator 300 depicted in FIG. 14 and concentrator 16 depicted in FIG. 9. By increasing the water depth in the individual discharge impellers to 0.55 inches from 0.25 inches, fewer discharge impellers disks are required and only five are depicted in discharge impeller 396. On the other hand, discharge impeller 96 of concentrator 16 uses nineteen discharge impeller disks. Also, the outer and inner diameter of the individual impeller disks has been increased so that a greater head can be developed. Similarly, the individual intake impeller disks of intake impeller 394 have been modified by increasing the water course depth to 0.5 inches from 0.25 inches, and fewer impeller disks are used, only 10 being used in intake impeller 394. However, three major changes have been made to concentrator 300. These include a second concentrated slurry discharge 302 being added upstream of slurry inlet 352, a repositioning of the rotor components with respect to vessel 380, and the addition of an outlet plenum 304 to concentrated slurry outlet 376. Outlet plenum 304 extends one-third of the way up impeller 394 and thus provides a large low-pressure area in which the slurry can accumulate. Plenum 304 instead of entering vessel 380 tangentially similar to concentrated slurry outlet 76 of concentrator 16, enters vessel 380 radially, as shown in FIG. 15. In addition, discharge impeller 396 is now positioned almost entirely in front of recycle outlet 354 so that the backwash of carrier upstream past orifice defining member 356 can be maintained and sufficient pressure can be developed to ensure the positive recycle flow through recycle outlet 354.

The second slurry discharge 302 provides a very highly concentrated slurry at low flow rates. Second slurry discharge 302 tangentially enters vessel 380, but at a point which is opposite the rotation of rotor 386, as shown in FIG. 15 by arrow 306. It is believed that highly concentrated slurry tends to creep upstream from slurry inlet 370 and to reside in the low flow, low turbulent area upstream of the forward end of rotor 386. With the addition of second slurry outlet 302, controlled operation of the flow rates therefrom (up to flow rates of 25 gpm) improves machine operation by lowering the residual sand concentrations in the fluid effluent and also significantly reduces the amount of rotor torque.

An automatic controller for concentrator 300 is depicted in FIG. 13 and is shown in a laboratory set-up in a configuration which is similar to that depicted in FIG. 4. Therefore, those elements which are identical will be numbered the same and not described further.

Two pneumatic control systems, 310 and 312, automatically control the operation of concentrator 300 by maintaining system pressure inside vessel 380 by controlling the primary concentrated slurry flow out of concentrator 300 and by controlling the secondary slurry flow out of concentrator 300, respectively. The fluid carrier flow is manually regulated with throttle valve 314 to a preselected value and set according to the flow measured by flow meter 316. Pressure controller system 310 comprises a conventional, 3 inch diameter butterfly valve 318 with a conventional pneumatic actuator 320 operated by a valve positioner 322. A conventional recording controller 324 which has proportional and integral action, such as a commercially available Foxboro Model 40, is connected to valve positioner 322. Valve 318 is spring loaded to close, but is prevented from closing completely with a high pressure limit relay on the controller output line. This is necessary so that concentrated slurry will continue to be flushed through the primary slurry discharge even if the vessel operating pressure should inadvertently fall below the set point pressure. Vessel pressure is preferably monitored upstream of orifice defining member 356 so that valve 318 will principally be controlled by the concentrated slurry pressure inside vessel 380.

Secondary slurry discharge 302 is controlled with another butterfly valve 326 and pneumatic actuator 328 and valve positioner 330 combination connected to a two-mode controller 331, such as the aforementioned Foxboro Model 40. Controller 331 receives a signal from a differential pressure transmitter 332 connected across an orifice 333 in the secondary slurry discharge line downstream of valve 326. Controller 312 uses oil to fill the diaphragm chamber of differential pressure transmitter 332. As connected, as shown in FIG. 13, secondary slurry controller 312 provides a density-sensitive flow controller.

In both concentrators depicted in FIGS. 9 and 14, slurry carryover into the liquid carrier was limited solely by non-sealing means, namely through the use of an orifice, backflow of carrier (which naturally reduces the proppant concentration), through vessel configuration and concentrated slurry flow patterns, and through other mechanical means, such as disks 214. However, it was found that a more efficient separation of the carrier flow and the concentrated slurry flow can be achieved through a uniquely designed rotor sealing means. This embodiment of the invention is depicted in concentrator 400 in FIG. 16 and the sealing means is depicted at 414.

Like concentrators 16 and 300, concentrator 400 comprises a substantially cylindrical, horizontally extending vessel 480, a rotor 486 mounted onto a shaft 488 which in turn is rotatably mounted for rotation inside vessel 480, such as in a conventional journal bearing 402. Rotor 486, however, only comprises a stabilizer 492, an intake impeller 494 and a rotor housing 474. Obviously missing from rotor 486 is a discharge impeller means. Instead there is simply an end cup 404 which has a plurality of orifices in the end thereof for permitting the separated carrier to be discharged from an internal passageway 498 inside rotor 486. A split bushing assembly 458 is used to mount the forward end of rotor 486 to shaft 488, but the rearward end of rotor 486 is keyed to shaft 488 and a conventional collar lock 406 with a radial tightening screw 408 is used to prevent axial movement of rotor 486 with respect to shaft 488. Stabilizer 492 is similar to stabilizer 92 and stabilizer 392 and therefore need not be described in greater detail. On the other hand, intake impeller 494 can either be similar to intake impeller 394 or 94, or can be of a new, squirrel cage type described hereinbelow.

Vessel 480 has a nominal, 8 inch diameter throughout and is comprised of a much thicker vessel wall so that concentrator 400 can withstand up to 5,000 psi of pressure. Vessel 480 has the standard mixture intake 470, concentrated mixture outlet 476 and separated medium outlet 478, all of which are tangentially connected to the interior of vessel 480. However, vessel 480 does not have a recycle line nor a secondary mixture discharge, since neither is needed. In addition, as should be evident from FIG. 16, the interior of vessel 480 has a simple cylindrical shape and reducers or enlarged portions. Obviously, the cylindrical shape greatly simplifies the ease and cost of manufacture. Vessel 480 is also provided with two instrument taps 410 and 412 provided on either side of a sealing means 414. Instrument taps 410 and 412 can be used for example to monitor the vessel pressure on either side of sealing means 414 so that a failure in the sealing means can easily be detected. In order to ensure positive rotation of sealing means 414, keyways 416 are provided in shaft 488, as noted above.

As a result of eliminating a recycle line and the necessity for backwash through an orifice defining member, it should be apparent that concentrator 400 has a greater efficiency than that of concentrators 16 and 300. If the efficiency of the concentrator is defined as follows:

$$E = (1 - A/C) \times 100 \qquad (16)$$

where
E = the efficiency in percent
A = the weight of sand carryover in the effluent per unit of time
C = the weight of sand flow in the machine per unit of time;

then the efficiency of concentrators according to the design of concentrator 16 or concentrator 300 ranged from 65% to 85% at carrier fluid flow rates of 60 to 80 gpm. It is noted that higher efficiencies were obtained occasionally at lower flow rates. It noted, however, the operating efficiency of concentrator 400 has an approximate range of 94% to 100% at flow rates of 50 to 100 gpm. On the other hand, because of the friction of the rotor sealing means 414, concentrator 400 required up to twice as much power and had up to twice as much rotor torque as did a concentrator similar to concentrator 16 or 300.

It is noted that the seal used with concentrator 400 in which the above efficiency figures and power and rotor torque were obtained had a packing seal gland where the seal gland was equipped with a latern ring to permit injection of a flushing medium. Unfortunately, a seal of this type had only an approximate lifetime of about 8 hours. A conventional gland seal is denoted a radial seal since the sealing surfaces are in the radial direction and extend axially. On the other hand, sealing means 414 depicted in FIG. 16 is denoted an axial seal because the seal is in the axial direction and the sealing elements extend radially.

An axial sealing means 441, depicted in FIG. 16, was found to be a far superior seal both because of longevity of the seal in the very abrasive environment of the sand slurry and because it works effectively even though there is vibration and lateral movement of shaft 488. With ordinary pump type packing such as in a radial seal, it is necessary to have a bearing close to the packing so that the shaft does not move laterally. Obviously, such lateral freedom of movement would quickly damage the packing. As mentioned above, rotor 486 can rotate at a very high speed, up to 2400 rpm, in a very dense environment and any unequal loading of the slurry could easily cause excessive vibrations and shaft movement, similar to an improperly loaded washing machine. An axial sealing means using a resilient sealing member has been found to be extremely effective in the environment of concentrator 400, and is described in greater detail hereinbelow.

Housing 474 has a similar construction to housing 174 in FIG. 9 and comprises a forward shell 418 telescopically received by a rearward shell 420 and rigidly mounted thereto with countersunk bolts 422. The forward end of forward shell 418 is integrally attached to a hub 424 which also serves as an end plate for intake impeller 494. The rearward end of rearward shell 420 is integral with end cap 404. As mentioned above, both hub 424 and end cap 404 (i.e., the forward and rearward end members of forward and rearward shells 418 and 420, respectively) are keyed to shaft 488 to prevent relative movement therebetween.

Sealing means 414 is comprised of a rotating member 426 concentrically mounted around housing 474 and rigidly secured thereto with bolts 422 and a stationary member 428. Stationary member 428 is rigidly mounted, for example with bolts 430, to an annular boss 432 which in turn, is integrally mounted to the inside of vessel 480 for example by being welded thereto. Stationary member 428 is comprised of an annular steel disk having an inner opening which is slightly larger than the external diameter of rearward shell 420 so as to permit movement therebetween. Seal rotating member 426 is comprised of a steel ring 434 which has a plurality of radial orifices 436 for receiving bolts 422 which rigidly mount rotating member 426 to housing 474 of rotor 486. Rotating seal member 426 is also comprised of a thick annular ring 438 made of natural rubber and rigidly bonded at the upstream face thereof to steel ring 434. The other face of rubber ring 438 abuts the forward face of steel ring 434 in sealing relationship therewith. Although rotating member 426 is tightly fitted around housing 474, an O-ring sealing means can be used to prevent flow between these two rotating elements.

A mechanical seal of the present invention which uses natural rubber against a steel face provides a longer life and a more reliable life for sealing means 414. In addition, by having the stationary member 428 located rearward of the rotating member 426, sealing means 414 can be easily removed for maintenance from the rearward end of vessel 480. The axial loading of the sealing faces of sealing means 414 is set in a conventional thrust bearing (not shown) and therefore the working fluid has no function in setting of the seal. A preferable loading on the sealing faces is 25 psi. By properly choosing the resiliency of rubber ring 438, a 25 psi loading will result in approximately 1/16 of an inch compression of rubber ring 438.

As mentioned above, intake impeller 94, 394, or 494 can be comprised of a plurality of individual disk impellers such as impeller 102 depicted in FIGS. 5 and 6. However, a preferable type of intake disk impeller is depicted at 500 in FIG. 17. Disk impeller 500 is comprised of three shorter vanes or lands 502 and three longer vanes or lands 504 which are interspersed between shorter lands 502. Lands 502 and 504 have an axial thickness and extend arcuately along an outer peripheral portion 506 of impeller 500. Longer lands 504 are each provided with a bore extending axially completely therethrough for receiving torque rods as mentioned above. Impeller 500 is provided with a central orifice 508 for mounting impeller 500 on the concentrator shaft. Three flow channels 510 having the shape of an annular segment are concentrically spaced around central orifice 508 and are divided by spokes 512.

The outer radial surface 514 of lands 502 and 504 comprise cylindrical segments and together define the circumference of a circle. Peripheral portion 506 extends radially beyond radial surface 514 so as to provide a flange 516 between lands of adjacent impellers 500. This can be seen by referring to impeller 394 in FIG. 14. Flanges 516 appear to be effective to reduce the turbulence between adjacent impeller disks 500 and thus improve linear flow into each disk impeller 500. In addition, flanges 516 prevent the formation of a large boundary surface surrounding rotor 386 and prevent axial migration of the mixture along impeller means 394. Finally, there are apparently some eddy currents set up by the rotation of rotor 386 which rotate in a longitudinal direction at 90° to the rotation of rotor 386. Flanges 516 tend to reduce these eddy currents and the turbulence generated thereby.

With reference now to FIGS. 18 and 19, a cylindrical impeller 600 similar to a "squirrel cage" is depicted with a plurality of axially extending, parallel slots 602. For the sake of clarity, each of the edges of slots 602 in FIG. 18 are labelled with a lower case letter and the equivalent edge is similarly labelled in FIG. 19. Slot 602 is cut through the wall of impeller 600 in two steps. In a first step, a longitudinal slot which enters the interior of impeller 600 tangential to the inner surface of the wall thereof is cut out. If the direction of rotation of impeller 600 is as shown by arrow 604 the tangential edge 606 is a trailing edge of a cross-sectional vane 608 formed between two adjacent slots 602. The angle $\theta$ between the outer radius, $R_1$, and the tangential edge 606 is given by the following equation:

$$\theta = \sin^{-1}(R_2/R_1) \tag{17}$$

where $R_1$ is the outer radius and $R_2$ is the inner radius of impeller wall 600.

On the other hand, the maximum thickness of slot 602 is determined by the requirement that any fluid entering slot 602 must have a tangential velocity component. This requirement is satisfied so long as there is an overlap between leading end 610 of one vane 608 and the trailing end 612 of the adjacent vane 608 in the direction of rotation. This thickness t is given by the following equation:

$$t = (R_2/R_1)(R_1 - R_2). \tag{18}$$

In order to provide slot 602 with an outer plenum or inlet 614 that is larger than an inner outlet 616, a portion of the leading edge 614 of vanes 608 is removed, such as by grinding. This then produces a slot having a cross-sectional shape that approximates an outward spiral in a direction opposite the direction of rotation.

An exemplary cylindrical impeller 600 can have the following dimensions. The inner radius, $R_2$ can be 1.803 inches and the outer radius, $R_1$ can be 2.25 inches which results in a wall thickness of 0.447 inches. This results in an angle $\theta$ of 53 degrees, 15 minutes. Slot 602 is provided by first cutting a tangential slot having a diameter of 0.375 inches and then grinding away a section of impeller wall having a triangular cross section formed by one edge of the tangential cut and a line perpendicular to a radius. Preferably, leading end 610 of vane 608 has a thickness of 0.125 inches so as to maintain structural integrity of impeller 600. Because impeller 600 has to be used at extremely high pressures and rotated at relatively high speeds, it is preferably made from a stainless steel pipe having an FDR 11.

The advantages of using a cylindrical impeller is that it reduces turbulence, provides a continuous longitudinal slot for removing the carrier and permits a smaller length impeller to be used to provide the same flow as would a plurality of disk impellers. Theoretically, the larger the slots, the lower will be the velocity of fluid entering the impeller on the one hand, but the more likely the longitudinal turbulence will be decreased. In any event, it is desirable to have laminar flow through impeller 600 and a flow pattern that approximates a free vortex.

Numerous tests have been conducted using prototype concentrators according to the present invention. Some of this data has been accumulated into three Tables, Table I providing information from a concentrator similar to the one depicted in FIG. 16, but having disk impellers of the type depicted in FIG. 17, and Tables II and III for a concentrator of the type depicted in FIG. 16 using the cylindrical impeller depicted in FIGS. 18 and 19. In the Tables, the intake rate and sand concentration of the slurry in is denoted S and $S_I$, respectively; the sand concentration in the slurry out and the carrier out is $S_O$ and $C_O$, respectively; and the slurry rate out was calculated from the slurry rate in and carrier rate out and assumes that total flow into the concentrator equals the total flow out.

Initially, however, it is noted that there was considerable difficulty in obtaining representative slurry and fluid samples. However, efforts were made to secure samples from the entire cross section of the various flow streams. The flow rates were calculated based on orifice meter readings using flow tables with corrections for slurry density. Because of the abrasive nature of the slurry, erosion of the orifice plate in the orifice meter occurred and the orifice plate had to be replaced from time to time. Fluid effluent flow rates were measured by a Turban water meter having a digital readout. However, indicated flows had a high rate of error and could be off by as much as 40%. Finally, it should be noted that the information has been arranged in the Tables according to rotor rpm and that some of the figures are outside an acceptable deviation. Also, the inlet pressure of the slurry was relatively low (about 40 psi) compared to operating pessures of 5,000 psi, but it is believed that higher pressures should not have any significant effect on the results. It is also possible that the composition of the slurry used in the tests (sand in a guar gum carrier) varied between the tests in the different tables and that this affected the concentration ratios.

A comparison of Table I and Table II shows that the concentration ratio (which is defined as the volume of the sand in the concentrated slurry being discharged divided by the amount of sand in the slurry being fed to the concentrator) increased approximately linear with the flow. However, the use of a cylindrical impeller permits a much greater carrier output flow which in turn results in a greater amount of concentration of sand in the concentrated slurry being discharged. The one other observation which can be made from the Tables is that the higher the rotational speed, the greater the concentration ratio. In other words, a desired output concentration of sand in the concentrated slurry can be achieved within certain limits by adjusting the rotor rotational speed.

It is again noted that the present invention has been described with respect to particular embodiments having exemplary orientations, dimensions and shapes, but the scope of the invention is not meant to be limited thereby. Furthermore, the present invention has been described for use in concentrating a slurry mixture of a solid medium and a liquid medium (a non-Newtonian fluid). Obviously, the present invention can be viewed in the opposite way as being a separator for removing one medium from a mixture of media and should be broadly considered with respect to the types of media which can be used therein.

Although the method and apparatus of the present invention have been described in detail with respect to exemplary embodiments thereof, it will be understood by those of ordinary skill in the art that variations and modifications may be effected within the scope and spirit of the invention.

TABLE I
(DISK IMPELLERS)
(Slurry Inlet Pressure 37-44 psig)

| Run No. | Rotor RPM | Slurry Rate In (GPM) (S) | Slurry Rate Out (GPM) (S-C) | Carrier Rate Out (GPM) (C) | (Vol. of Sand/l.) $S_I$ | $S_O$ | $C_O$ | Concentration Ratio ($S_O S/i$) |
|---|---|---|---|---|---|---|---|---|
| 5 | 890  | 200 | 150 | 50  | 165 | 220 | O-T | 1.33 |
| 4 | 1080 | 175 | 103 | 72  | 165 | 280 | O-T | 1.70 |
| 3 | 1280 | 171 | 76  | 95  | 165 | 370 | O-T | 2.24 |
| 1 | 1505 | 180 | 90  | 90  | 165 | 330 | O   | 2.00 |
| 2 | 1525 | 187 | 77  | 110 | 165 | 400 | O-T | 2.42 |
| 6 | 2005 | 239 | 80  | 159 | 165 | 490 | O-T | 2.97 |
| 7 | 2205 | 236 | 73  | 163 | 165 | 530 | O-T | 3.21 |

TABLE II
(CYCLINDRICAL IMPELLER)
(Slurry Inlet Pressure 44-49 psig)

| | | | | | | (Vol. of Sand/l.) | | |
|---|---|---|---|---|---|---|---|---|
| 10 | 1140 | 202 | 87 | 115 | 235 | 545 | T   | 2.34 |
| 9  | 1145 | 172 | 92 | 80  | 235 | 440 | O   | 1.87 |
| 15 | 1160 | 153 | 63 | 90  | 165 | 400 | O-T | 2.42 |
| 8  | 1160 | 188 | 63 | 125 | 165 | 490 | T   | 2.97 |
| 13 | 1180 | 180 | 80 | 100 | 165 | 310 | O-T | 1.88 |
| 14 | 1180 | 187 | 77 | 110 | 165 | 400 | T   | 2.42 |
| 21 | 1180 | 221 | 91 | 130 | 165 | 400 | O-T | 2.42 |
| 16 | 1300 | 201 | 71 | 130 | 165 | 465 | T   | 2.82 |
| 17 | 1350 | 201 | 71 | 130 | 165 | 465 | T   | 2.82 |
| 6  | 1400 | 182 | 70 | 112 | 165 | 430 | O-T | 2.61 |
| 7  | 1420 | 177 | 67 | 110 | 165 | 435 | O   | 2.64 |
| 18 | 1620 | 194 | 58 | 136 | 165 | 550 | O-T | 3.33 |
| 5  | 1640 | 178 | 68 | 110 | 165 | 430 | O-T | 2.61 |
| 20 | 1800 | 215 | 55 | 160 | 165 | 645 | T   | 3.91 |
| 11 | 1845 | 216 | 72 | 144 | 235 | 705 | O-T | 3.0 |
| 19 | 1850 | 205 | 55 | 150 | 165 | 610 | O-T | 3.70 |
| 1  | 1955 | 144 | 32 | 112 | 165 | 690 | O-T | 4.18 |
| 2  | 2200 | 156 | 36 | 120 | 165 | 705 | T   | 4.27 |
| 12 | 2240 | 231 | 60 | 171 | 210 | 805 | T   | 3.83 |
| 3  | 2400 | 166 | 34 | 132 | 165 | 800 | T   | 4.85 |
| 4  | 2500 | 187 | 37 | 150 | 165 | 840 | O   | 5.09 |
| 23 | 2600 | 202 | 42 | 160 | 165 | 790 | T   | 4.79 |
| 22 | 2640 | 214 | 44 | 170 | 165 | 800 | T   | 4.85 |

TABLE III
(CYLINDRICAL IMPELLER)
(Slurry Inlet Pressure About 40 psig)

| | | | | | Vol. of Sand (gal. of sand/gal.) | | | |
|---|---|---|---|---|---|---|---|---|
| 1 | 1225 | 160 | 50 | 110 | .16 | .5  | O | 3.125 |
| 2 | 1600 | 170 | 35 | 135 | .16 | .78 | O | 4.875 |

We claim:

1. A concentrator for removing a medium from a mixture of media comprising:
   an elongate vessel having a mixture intake and a concentrated mixture outlet spaced downstream from said mixture intake and having a removed medium outlet; and
   an elongate rotor rotatably mounted for rotation in a forward direction inside said vessel so as to define an annular channel between said vessel and said rotor, said rotor having an internal passageway and comprised of intake impeller means for drawing off the medium from said annular channel into said internal passageway, rotor seal means axially located between said concentrated mixture outlet and said removed medium outlet for limiting flow of said concentrated mixture into said removed medium outlet, and means for connecting said internal passageway in communication with said removed medium outlet.

2. A concentrator as claimed in claim 1 wherein said seal comprises an axial seal means.

3. A concentrator as claimed in claim 2 wherein said seal means comprises a hard sealing element and a resilient sealing element, one of which is stationary and the other of which is rotary.

4. A concentrator as claimed in claim 2 wherein said seal means comprises a stationary annular hard sealing element rigidly mounted to the inner side of said vessel.

5. A concentrator as claimed in claim 4 wherein said seal means further comprises a rotating resilient sealing element rigidly mounted in sealed relationship around said rotor and in sealing engagement along a radial plane with a radial face thereof with a radial face of said hard sealing element.

6. A concentrator as claimed in claim 5 wherein said removed medium outlet is located downstream of said concentrated mixture outlet, and wherein said stationary sealing element is located downstream of said rotating sealing element so as to provide access to said rotating sealing element.

7. A concentrator as claimed in claim 2 wherein said rotor further comprises a cylindrical housing having openings at each end thereof, the forward end thereof rigidly mounted to the rearward end of said impeller means and the rearward end thereof comprising said connecting means and being in fluid communication with said removed medium outlet; and
   wherein said seal means comprises one sealing element rigidly mounted to said vessel and a second sealing element rigidly mounted concentrically around said housing.

8. A concentrator as claimed in claim 7 wherein said one sealing element is comprised of a rigid, hard material and said second sealing element is comprised of a resilient material.

9. A concentrator as claimed in claim 8 and further comprising means for externally loading said seal means so as to compress said second sealing element against said first sealing element.

10. A concentrator as claimed in claim 8 wherein said second sealing element is comprised of natural rubber.

11. A concentrator as claimed in claim 1 wherein said intake impeller means comprises a hollow, substantially cylindrical member having a closed forward end and an open rearward end and said member has at least one, axially extending tangential slot in said wall thereof.

12. A concentrator as claimed in claim 11 wherein said member has an outer radius of $R_1$, and an inner radius of $R_2$ and wherein the angle $\theta$ between the leading edge of said slot with the outer radius $R_1$ is given by:

$$\theta = \sin^{-1}(R_2/R_1).$$

13. A concentrator as claimed in claim 11 wherein the maximum thickness t of said slot is such that any fluid entering said slot must have a tangential component of velocity and is given by:

$$t = (R_1 - R_2)(R_2/R_1).$$

14. A concentrator as claimed in claim 11 wherein said slot extends radially from the inside of said member in a direction opposite of the direction of forward rotor rotation such that the leading edge of said slot defines a line tangent to the inner surface of said member.

15. A concentrator as claimed in claim 14 wherein a portion of the trailing edge of said slot defining wall of said member is removed such that the inlet opening of said slot is larger than the outlet opening of said slot.

16. A concentrator as claimed in claim 1 wherein said intake impeller means comprises a hollow substantially cylindrical member having a closed forward end and an open rearward end and said member having a plurality of elongate, axially extending, parallel slots through the wall thereof, each said slot having a cross-section which is larger at the outer inlet than at the inner outlet and extending through the wall of said member such that a radius of said member cannot pass completely through said slot without intersecting said slot defining wall.

17. A concentrator as claimed in claim 16 wherein said slot extends outwardly through the wall of said member in a direction opposite the forward direction of rotation of said member.

18. A concentrator for removing a medium from a mixture of media comprising:
an elongate vessel having a mixture intake and a concentrated mixture outlet spaced downstream from said mixture intake and having a removed medium outlet; and
an elongate rotor rotatably mounted for rotation in a forward direction inside said vessel so as to define an annular channel between said vessel and said rotor, said rotor having an internal passageway and comprised of intake impeller means for drawing off the medium from said annular channel into said internal passageway, means axially located between said concentrated mixture outlet and said removed medium outlet for limiting flow of the concentrated mixture into said removed medium outlet, and means for connecting said internal passageway with said removed medium outlet, said intake impeller means comprising a hollow, substantially cylindrical member having one end closed and the other end open, and said member having a plurality of passageways through the wall thereof, each said passageway comprising an axially extending slot which extends through said member wall such that a radius of said member cannot pass completely through said slot and hence such that any medium entering said slot must have a tangential component of velocity.

19. A concentrator as claimed in claim 18 wherein said slot extends outwardly through the wall of said member in a direction opposite the forward direction of rotation of said member.

20. A concentrator as claimed in claim 19 wherein a portion of the trailing edge of said slot defining wall is removed such that the inlet opening to said slot is larger than the outlet opening of said slot.

21. A concentrator as claimed in claim 18 wherein said slot is tangential to said member wall.

* * * * *